(12) United States Patent
Carter et al.

(10) Patent No.: US 12,369,747 B2
(45) Date of Patent: *Jul. 29, 2025

(54) INTEGRATED KAMADO-STYLE GRILL AND SMOKER

(71) Applicant: Premier Specialty Brands LLC, Chamblee, GA (US)

(72) Inventors: Adam Carter, Auburn, AL (US); Donald Stephen Gazdick, III, Suwanee, GA (US); Joseph Pruitt, Athens, GA (US); Daniel Mercer, Hamilton, GA (US); Kyle Aasness, Houston, TX (US)

(73) Assignee: Premier Specialty Brands LLC, Chamblee, GA (US)

( * ) Notice: Subject to any disclaimer, the term of this patent is extended or adjusted under 35 U.S.C. 154(b) by 241 days.

This patent is subject to a terminal disclaimer.

(21) Appl. No.: 18/216,674

(22) Filed: Jun. 30, 2023

(65) Prior Publication Data

US 2023/0337856 A1    Oct. 26, 2023

Related U.S. Application Data

(63) Continuation of application No. 17/843,041, filed on Jun. 17, 2022, now Pat. No. 11,819,161, which is a
(Continued)

(51) Int. Cl.
*A47J 37/07* (2006.01)
*A23B 4/052* (2006.01)

(52) U.S. Cl.
CPC ........... *A47J 37/0704* (2013.01); *A23B 4/052* (2013.01); *A47J 37/0754* (2013.01); *A47J 37/0786* (2013.01)

(58) Field of Classification Search
CPC ................ A47J 37/0704; A47J 37/0754; A47J 37/0786; A47J 37/0709; A47J 537/079;
(Continued)

(56) References Cited

U.S. PATENT DOCUMENTS

| 7,644,711 B2 | 1/2010 | Creel |
| 10,158,720 B2 | 12/2018 | Colston |

(Continued)

FOREIGN PATENT DOCUMENTS

| CL | 2006/003107 B1 | 4/2007 |
| CN | 105662169 A | 6/2016 |
| RU | 2713539 C1 | 2/2020 |

OTHER PUBLICATIONS

Break It Yourself: "Kamado Joe iKamand 2nd Generation Review/Rant," Mar. 1, 2019, XP55863627, available at https://www.youtube.com/watch?v=slmWoMaTt4o (retrieved Nov. 19, 2021).
(Continued)

*Primary Examiner* — Phuong T Nguyen
(74) *Attorney, Agent, or Firm* — Miller & Martin PLLC

(57) ABSTRACT

The disclosed embodiments provide a kamado-style grill and smoker having one or more air-intake openings and one or more exhaust openings. Like conventional kamado-style grills and smokers, a user may manually adjust the air-intake opening(s) and/or exhaust opening(s) to manually control the air flow, and thus the temperature, within the cooking chamber. However, unlike the prior art, the kamado-style grill and smoker includes an integrated fan unit that provides a completely different and alternative air-intake pathway for drawing air into the cooking chamber and controlling the cooking or smoking temperature using a fan. By providing this alternative mechanism for controlling the temperature in the cooking chamber, the kamado-style grill and smoker disclosed herein can be operated using either manual or
(Continued)

automated temperature control, making it accessible to both novice and experienced users alike.

10 Claims, 16 Drawing Sheets

Related U.S. Application Data continuation of application No. 17/410,790, filed on Aug. 24, 2021, now Pat. No. 11,382,457.

(60) Provisional application No. 63/081,198, filed on Sep. 21, 2020.

(58) Field of Classification Search
CPC .......... A47J 36/321; A47J 36/34; A47J 36/36; A47J 36/10; A47J 37/0759
USPC ......... 99/326, 334, 419, 444, 473, 481, 482; 219/385, 392, 400, 401
See application file for complete search history.

(56) References Cited

U.S. PATENT DOCUMENTS

| | | |
|---|---|---|
| 10,299,626 B2 | 5/2019 | Walters et al. |
| 10,652,386 B2 | 5/2020 | Colston |
| 11,022,316 B2 | 6/2021 | Walters et al. |
| 2008/0138194 A1 | 6/2008 | Wei et al. |
| 2008/0233861 A1 | 9/2008 | Jenkins et al. |
| 2009/0215380 A1 | 8/2009 | Lin |
| 2013/0061765 A1 | 3/2013 | Reinhart |
| 2018/0376614 A1 | 12/2018 | Xiong et al. |
| 2019/0117018 A1* | 4/2019 | Walters ............... A47J 37/0759 |
| 2019/0234647 A1 | 8/2019 | Chen et al. |
| 2020/0053198 A1* | 2/2020 | Colston ................... H04Q 9/00 |
| 2020/0093145 A1 | 3/2020 | Powell et al. |
| 2020/0113383 A1 | 4/2020 | Hackley |
| 2020/0214503 A1 | 7/2020 | Altenritter |
| 2020/0260911 A1 | 8/2020 | Brennan |
| 2020/0315400 A1* | 10/2020 | Mansueto ............. F24B 13/004 |
| 2022/0248903 A1 | 8/2022 | Parker et al. |

OTHER PUBLICATIONS

"Learn How Green Mountain Grills Work: Pellet Smokers and Grills," Aug. 14, 2015, http://web.archive.org/web/20150814035439/ https://greenmountaingrills.com/products/how-it-works.

International Search Report and Written Opinion of the International Searching Authority, dated Dec. 8, 2021, for PCT/US2021/047351.

\* cited by examiner

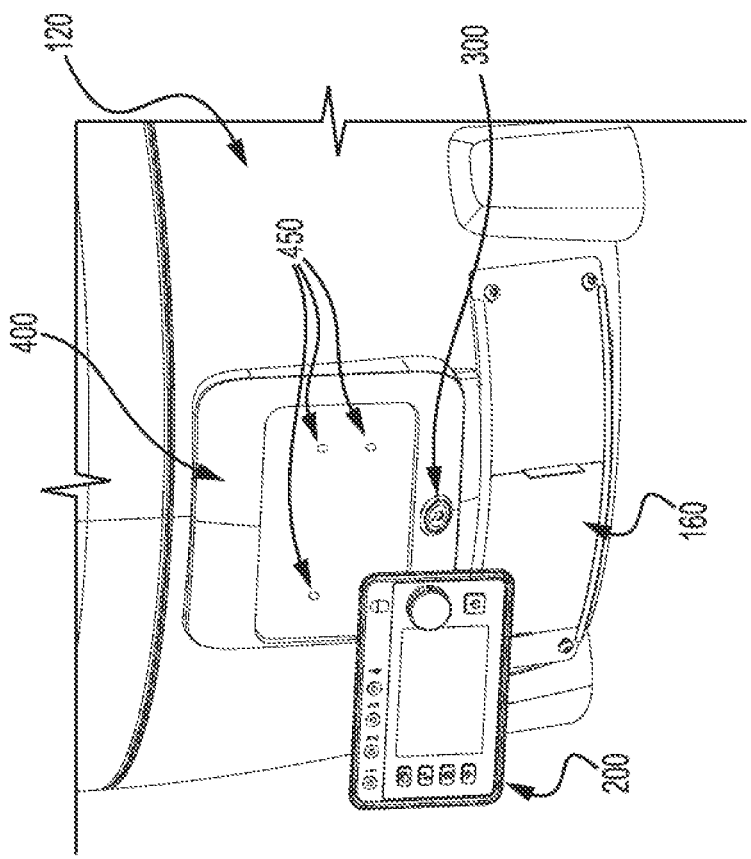
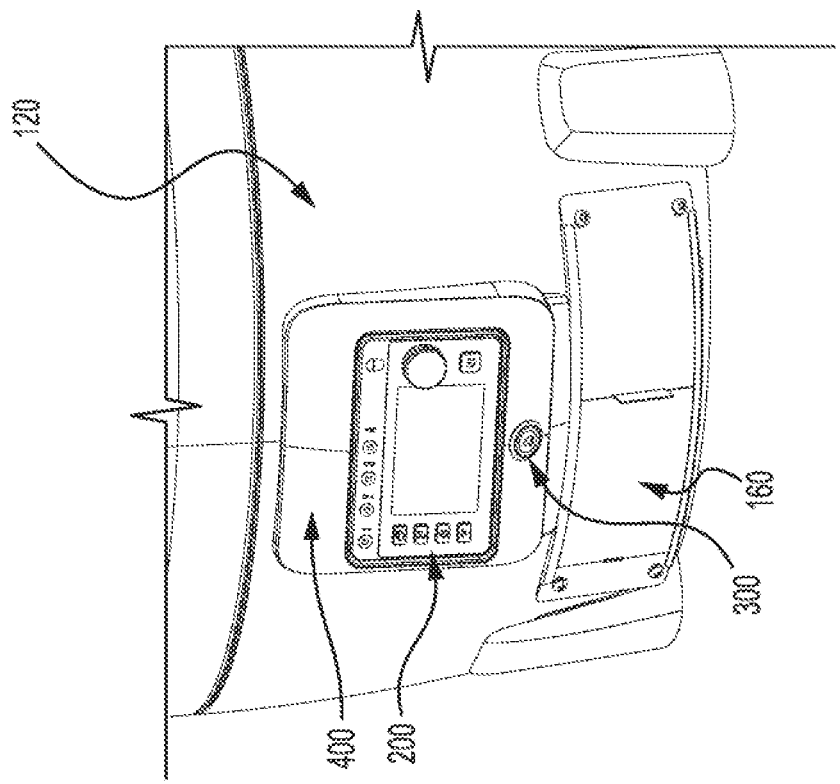
FIG. 4A
FIG. 4B

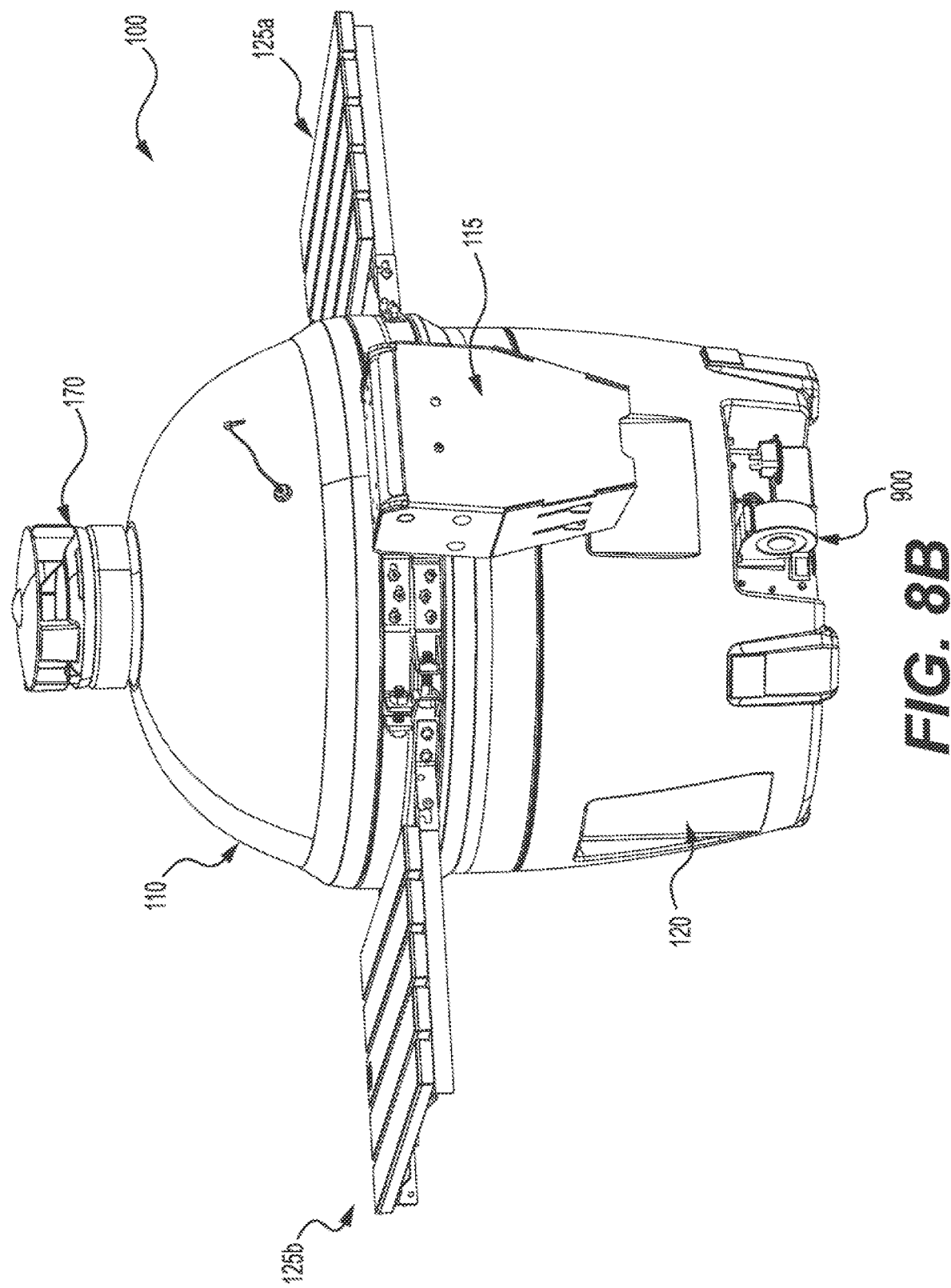

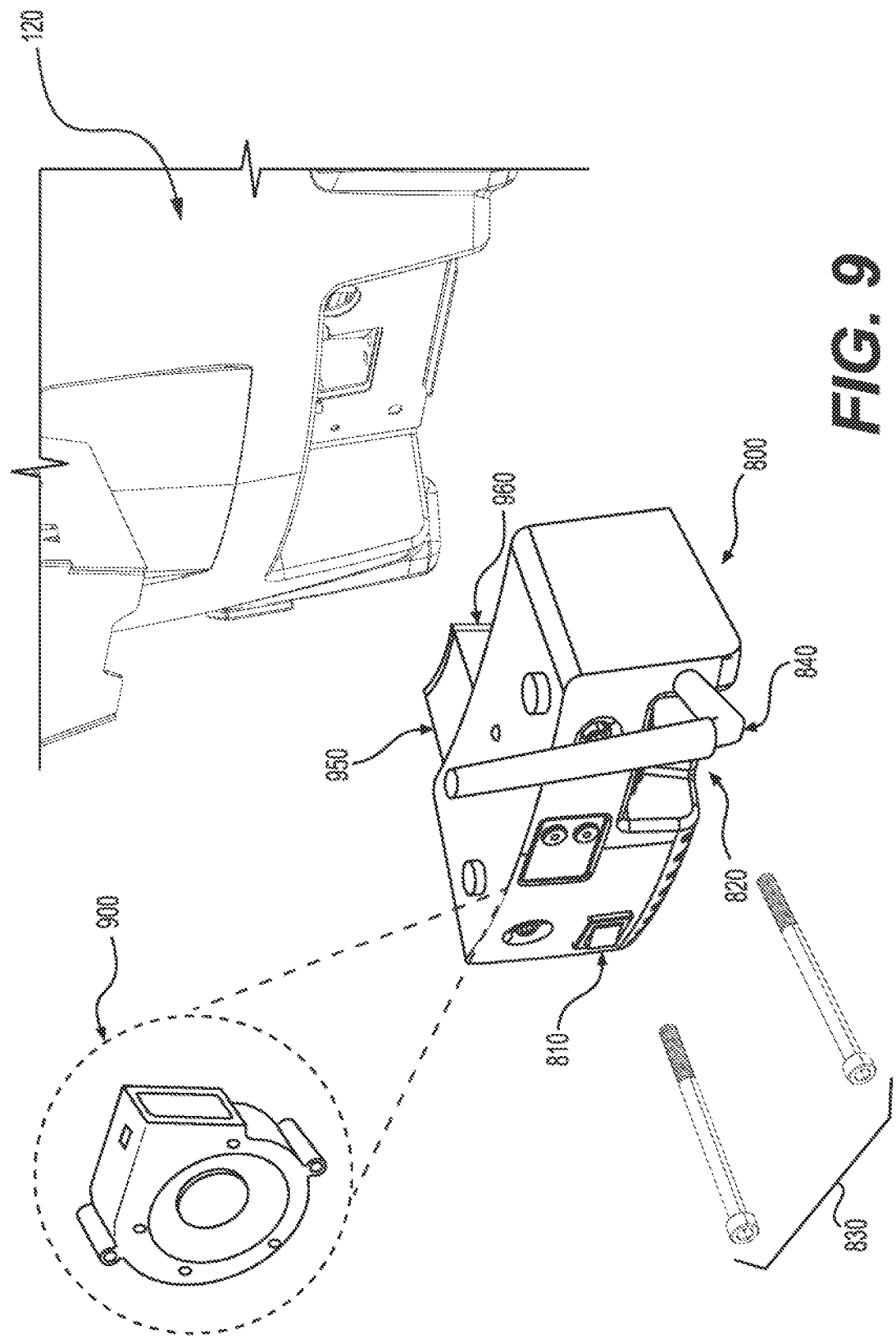

INTEGRATED KAMADO-STYLE GRILL AND SMOKER

CROSS REFERENCE TO RELATED APPLICATION

The present application claims priority as a continuation of U.S. patent application Ser. No. 17/843,041, entitled "Integrated Kamado-Style Grill and Smoker," filed Jun. 17, 2022, which is a continuation of U.S. patent application Ser. No. 17/410,790, entitled "Integrated Kamado-Style Grill and Smoker," filed Aug. 24, 2021, which claims the benefit of priority under 35 U.S.C. § 119 (e) to U.S. Provisional Application No. 63/081,198, entitled "Integrated Kamado Grill," filed Sep. 21, 2020, which are all hereby incorporated by reference in their entireties as if fully set forth herein.

FIELD OF THE INVENTION

The present invention generally relates to temperature control of fuel-burning cookers, and more particularly, to novel kamado-style grills and smokers that can be more easily operated to control their internal temperatures during operation.

BACKGROUND OF THE INVENTION

"Kamado" is the Japanese term for a traditional cooking stove fueled by wood or charcoal. In its more modern sense, the term kamado has come to denote a wood-fired and/or charcoal-fired cooking vessel typically made from ceramic, clay, terracotta, cement, or crushed lava rock to create a grill that can withstand temperatures in excess of 750 degrees Fahrenheit without cracking from extreme heat or temperature fluctuations. Modern kamados, referred to herein as "kamado-style" grills, may be formed from any suitable refractory materials, including but not limited to the materials above alone or in combination with other materials, such as metals and metal alloys. For example, the refractory materials in kamado-style grills may include advanced or engineered ceramics, such as composite and/or reinforced ceramics. The refractory materials are used to form an enclosed cooking chamber that is resistant to decomposition by heat and that retains its shape when the kamado-style grill is in use.

Because kamado-style grills are highly efficient at retaining heat, they can be used to maintain consistent cooking temperatures over a large temperature range, such as between 225 and 750 degrees Fahrenheit. As a result, a kamado-style grill provides a versatile cooking apparatus that can be used for grilling, smoking, stewing, roasting, and baking many different kinds of foods. Further, because a kamado-style grill may be used as a grill or a smoker, it may be interchangeably referred to herein as a "kamado-style grill," "kamado-style smoker," "kamado-style grill and smoker," "kamado-style cooker," etc.

A kamado-style grill may comprise an egg-shaped body with a domed top cover, where the body is made of relatively thick ceramic or other refractory material. Kamado-style grills usually have a hinged top because the ceramic top dome can be very heavy and difficult to handle if it were not attached to the body of the grill. The cooking chamber of the kamado-style grill, i.e., the enclosed portion containing the heating fuel and the cooking surface, is typically ovoid in shape with circular or oval horizontal cross-sections, though square, rectangular, and other horizontal cross-sectional areas are also possible.

The cooking chamber of a kamado-style grill is usually heated by a combustible fuel, such as charcoal or wood, placed in the bottom of the chamber formed within the grill base. The base and top portions of kamado-style grills have one or more adjustable vents, chimneys, air control dampers, or other openings that provide the user with a means for controlling the flow of air through the cooking chamber. By adjusting the amount of air permitted to pass through such air-intake and exhaust openings, a user can control the temperature inside the cooking chamber.

The construction materials and good air control give kamado-style grills excellent insulation, high heating efficiency, and the ability to hold very high temperatures without significant heat loss, making them especially suited for a wide range of grilling, roasting, baking, and smoking. Despite these advantages, however, conventional kamado-style grills generally require a significant learning curve to learn how to precisely control the amount of air flow, and thus the cooking or smoking temperature, inside the cooking chamber. The process of controlling the cooking or smoking temperature within the kamado-style grill can be a tedious process of igniting the charcoal or wood fuel within the cooking chamber (or in a firebox within the cooking chamber) and then subsequently maintaining, adjusting, and fine-tuning the amount of air flow in the grill, which can be daunting for beginners.

In particular, a user of a conventional kamado-style grill manually adjusts one or more air-intake openings in the base of the grill and manually adjusts one or more exhaust openings that allow smoke, steam, and other gases to escape through the top dome (or a chimney attached to the top dome). The temperature in the cooking chamber can be highly sensitive to the sizes of these openings selected by the user, often requiring trial and error (with feedback from an internal thermometer) to adequately adjust the opening sizes of the vents, chimneys, and dampers to achieve a desired internal temperature. In addition, the temperature within the cooking chamber is also highly dependent on the amount and distribution of the charcoal or wood fuel positioned in a firebox or otherwise located within the cooking chamber. Managing both the fuel burning and air flow within the cooking chamber of the kamado-style grill can be a difficult process for inexperienced users trying to control the cooking or smoking temperature.

Further still, users often open the top dome of the kamado-style grill to check on the food products being cooked or smoked in the cooking chamber. When the top dome is opened, a large amount of heat from within the cooking chamber can rapidly escape, which drops the cooking or smoking temperature significantly. Then, when the top dome is closed again, users often increase the size of the openings of the vents, chimneys, and/or dampers of the grill to quickly drive the temperature back to where it was before the top cover was opened. Users often overshoot or otherwise create temperature instability in their attempt to quickly return the cooking chamber to its earlier cooking or smoking temperature.

There is therefore a need in the art for an improved kamado-style grill that would allow users to more easily control the temperature of the cooking chamber when operating the grill.

SUMMARY OF THE INVENTION

The disclosed embodiments provide a kamado-style grill and smoker comprising a top shell and a bottom shell, each of which may be ovoid shaped or any other shape so long as the top shell can be positioned over the bottom shell to define a cooking chamber therein. The kamado-style grill and smoker includes one or more air-intake openings in the bottom shell and one or more exhaust openings in the top shell or in a vent or chimney coupled to the top shell. Like conventional kamado-style grills and smokers, a user may manually adjust the air-intake opening(s) and/or exhaust opening(s) to manually control the air flow, and thus the temperature, within the cooking chamber. However, unlike the prior art, the kamado-style grill and smoker includes an integrated fan unit that provides a completely different and alternative air-intake pathway for drawing air into the cooking chamber and controlling the cooking or smoking temperature using a fan. By providing this alternative mechanism for controlling the temperature in the cooking chamber, the kamado-style grill and smoker disclosed herein can be easily operated by both novice and experienced users alike.

In accordance with the disclosed embodiments, a fan unit is integrated into the bottom shell of the kamado-style grill and smoker. The fan unit comprises a fan, a fan outlet, and an adjustable flap positioned adjacent to the fan outlet. When the fan is turned on, it is configured to draw air from outside of the kamado-style grill and smoker and force the outside air through the fan outlet (e.g., an air duct) and into the cooking chamber while the flap of the fan unit is positioned in an "open" position. If the user chooses not to use the fan and instead manually control air flow into the cooking chamber by adjusting an aperture size of one or more air-intake openings in the bottom shell, the fan is turned off and the flap of the fan unit is positioned in a "closed" position that seals off the fan outlet, thereby preventing air from flowing out of the cooking chamber and into the fan outlet.

The integrated fan unit in the disclosed embodiments may be controlled by an associated control unit. The control unit may communicate with the integrated fan unit using any type of wired or wireless connections, protocols, or analog and/or digital signals. In the disclosed embodiments, the control unit may send control signals to the integrated fan unit corresponding to either a first or second mode of operation, depending on which mechanism is being used to control the temperature in the cooking chamber. The first mode, for example, may correspond to a user's manual control of the temperature, whereas the second mode may correspond to an automated control mechanism using the integrated fan unit.

In the first mode, for example, the control unit sends control signals to turn off the fan and position the adjustable flap in its fully closed position because this mode corresponds to when the user has chosen not to use the fan and instead control the temperature of the cooking chamber through manual adjustment of the air-intake and exhaust openings. In the second mode, however, the control unit may send control signals to turn on the fan and position the flap in its open position. In some embodiments, the control unit may control the fan in the second mode to operate intermittently or periodically and/or allow the flap to be positioned in one or more partially-open positions. When the control unit controls the integrated fan unit in the second mode, the control unit may be configured to selectively control a speed of the fan, a timing or sequence for modulating when the fan is operated, and/or a position of the adjustable flap. In some embodiments, the control unit also may generate signals for controlling an aperture size of one or more air-intake openings, an aperture size of one or more exhaust openings, and/or a position of one or more air-control dampers to further control the amount of air flow in the cooking chamber while in the second mode. Using feedback from temperature sensors in the cooking chamber and by sending control signals to the integrated fan unit, the control unit can employ one or more automated temperature control strategies while in the second mode.

Further to the disclosed embodiments, the control unit may not allow the integrated fan unit to operate in the second mode if the control unit detects that any of the air-intake openings in the bottom shell are not fully closed, e.g., suggesting that the user intended to manually adjust the opened air-intake opening(s). In some embodiments, the kamado-style grill and smoker includes at least one sensor coupled to the one or more air-intake openings in the bottom shell to generate a signal indicating when any of the air-intake openings is not fully closed. The control unit may be configured to receive the sensor's generated signal and determine whether the integrated fan unit may enter the second mode based on at least the received sensor signal.

In the second mode, the control unit may receive input signals from one or more temperature sensors (such as resistance temperature detectors ("RTD"), thermocouples, or any other type of digital or analog temperature sensors) positioned in the cooking chamber or inserted as probes into one or more food products in the cooking chamber. The control unit may generate control signals for the integrated fan unit based on sensor signals it receives corresponding to measured temperatures at one or more locations in the cooking chamber and/or internal temperatures of one or more food products. In some embodiments, the control unit also may control an igniter for starting combustion of the fuel within the cooking chamber, providing additional automation that is not conventionally attainable in kamado-style grills and smokers.

In the disclosed embodiments, the control unit is preferably implemented as a separate device or module in communication with the integrated fan unit, although alternatively it may be implemented directly within the fan unit. The control unit may be a hardware module that is either permanently or removably attached to either the top or bottom shell. The control unit may comprise one or more user-interface components, such as hardware and/or software components, that allow a user to select a desired cooking or smoking temperature. The control unit may include a display unit for displaying, for example, one or more temperature measurements, temperature set points, or any other information associated with the kamado-style grill or smoker. The display unit may comprise a touch screen with one or more user-interface elements.

In accordance with certain embodiments, the control unit may be configured to communicate with one or more remote devices (such as phones, tablets, laptops, desktops, wearable devices, or any other user devices) over wireless connections. In such embodiments, the user may input information to send to the control unit using an application executing on a mobile device. The mobile device may transmit this user-inputted information to the control unit over a direct wireless connection (such as using Bluetooth or another peer-to-peer wireless protocol) or, alternatively, through a wireless network (such as an 802.11 wireless network) to which both the control unit and mobile device are connected. The control unit may be configured to transmit information back to the mobile device for display to the user. For example, rather than or in addition to displaying graphical user interfaces on its display unit, the control unit may transmit information to allow the same or similar graphical user interfaces to be displayed by the application executing on the user's mobile device.

The control unit also may be configured to communicate information over a wireless network to one or more remote computers, for example, in a cloud-computing platform. For example, the control unit may transmit information about the kamado-style grill and smoker to a cloud service and/or receive recommendations or instructions from the cloud service, for instance, about how to optimize control of the integrated fan unit and/or other actuators for precisely controlling the temperature inside the kamado-style grill and smoker.

Advantageously, the disclosed embodiments provide an automated temperature-control mechanism using the control unit and integrated fan unit that allows beginners to more easily control the temperature in a kamado-style grill and smoker. After the user becomes more experienced and comfortable using the kamado-style grill and smoker, the user can change to a completely manual temperature-control mode that does not use the integrated fan unit. The kamado-style grill and smoker disclosed herein therefore eliminates difficulties in controlling the cooking and smoking temperature that conventionally dissuade beginners from using kamado-style grills and smokers, while providing the same manual temperature adjustments that more experienced users often expect and prefer.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples:

FIG. 4A illustrates an exemplary control unit that may be used to control a temperature regulation apparatus, which may be a fan unit, integrated into the bottom shell of the kamado-style grill and smoker of FIG. 1 in accordance with certain disclosed embodiments.

FIG. 4B illustrates the exemplary control unit of FIG. 4A when it is configured to be detachable from the kamado-style grill and smoker of FIG. 1 in accordance with certain disclosed embodiments.

FIG. 8B is a rear perspective view of an exemplary kamado-style grill and smoker in FIG. 8A with a rear panel of the temperature regulation apparatus removed to show a fan that may be implemented in the integrated temperature control apparatus in accordance with certain disclosed embodiments.

FIG. 9 is a perspective view of an exemplary temperature regulation apparatus that may be integrated into the bottom shell of a kamado-style grill and smoker in accordance with certain disclosed embodiments.

DETAILED DESCRIPTION OF THE DISCLOSED EMBODIMENTS

In accordance with the disclosed embodiments, a kamado-style grill and smoker not only comprises manually-adjustable air-intake openings in the lower body of the grill, but also comprises a temperature control system comprising a temperature regulation apparatus that is integrated within the lower body of the grill and that employs an alternative air-intake pathway into the grill's cooking chamber. The kamado-style grill and smoker in the disclosed embodiments comprises a control unit that communicates with the integrated temperature regulation apparatus to control a fan within the temperature regulation apparatus to provide temperature regulation in the cooking chamber of the grill. The control unit is configured to ensure that the user cannot use the integrated temperature regulation apparatus at the same time the user has chosen to control the temperature through manual adjustment of one or more one air-intake openings in the lower body of the grill.

Figure 1:
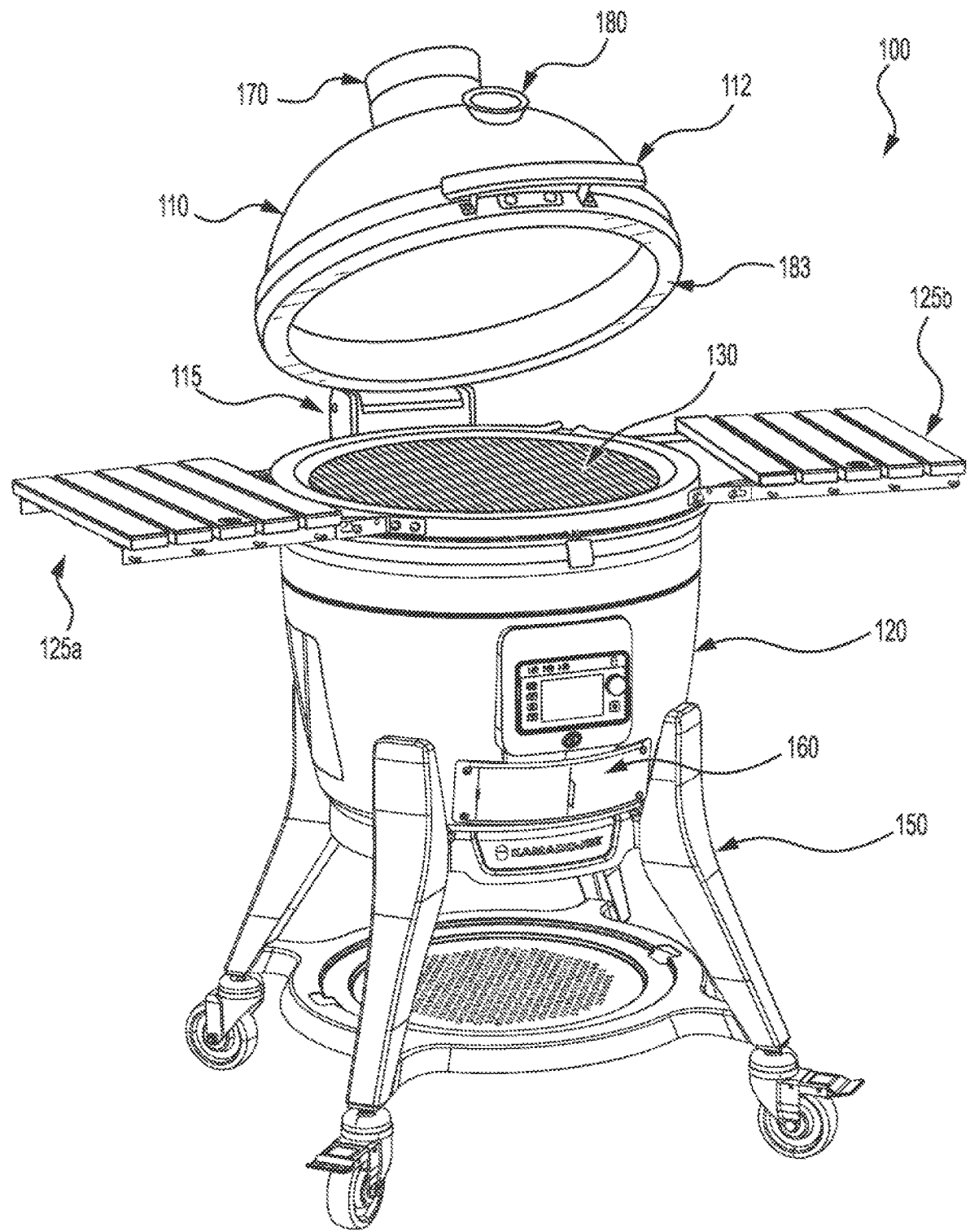
FIG. 1 is a front perspective view of an exemplary kamado-style grill and smoker that may be used in accordance with certain disclosed embodiments.

FIG. 1 shows an exemplary kamado-style grill and smoker 100 that may be used in accordance with certain disclosed embodiments. The body of the kamado-style grill and smoker is constructed with a top shell 110 and bottom (base) shell 120 connected by a hinge 115. A user may lift the top shell 110 of the kamado-style grill and smoker using a handle 112 attached to a front surface of the top shell. The hinge 115 is preferably spring-loaded and configured to stably hold the top shell 110 at different angular positions above the bottom shell 120 as FIG. 1 shows. In some embodiments, the hinge 115 may be a counterbalanced hinge in which the top shell 110 can be closed in a controlled manner. In alternative embodiments, the top shell may be completely detachable from the bottom shell rather than hingedly connected as shown in FIG. 1.

The top and bottom shells 110, 120 are preferably ovoid shaped, but alternatively either or both may comprise different shapes as long as the top shell can be positioned as a cover over the bottom shell. The top and bottom shells preferably comprise relatively thick walls of ceramic or other refractory materials to provide a rigid structure as well as retain heat within the cooking chamber during operation of the grill. In some embodiments, the top and bottom shells also may include or be composed of other materials, such as metals or metal alloys. For instance, in an exemplary embodiment, the bottom shell can comprise a combination of ceramic and steel wherein the steel portion is cinched to the ceramic portion. For instance, in another embodiment, the kamado-style grill and smoker may be a kamado-style kettle grill and smoker. When the top shell 110 is closed over the bottom shell 120, they create an enclosed cooking chamber within the kamado-style grill 100. A high-temperature gasket material 183 may be placed around the periphery of the top of the bottom shell 120 and/or around the periphery of the bottom of the top shell 110 to help prevent heat from escaping the cooking chamber when the top shell 110 is closed over the bottom shell 120 while cooking and/or smoking food products on the grill.

The kamado-style grill and smoker 100 comprises at least one cooking rack 130 that may be seated at or near the top of the bottom shell 120 to hold one or more food products to be cooked or smoked. In alternative embodiments, the kamado-style grill and smoker 100 may comprise one or more cooking racks or a system for providing tiered cooking, such as that described, for instance, in U.S. application Ser. No. 16/790,912 entitled "Tiered Rack for Cooking Apparatus," which is hereby incorporated by reference as if set forth fully herein.

Figure 2:
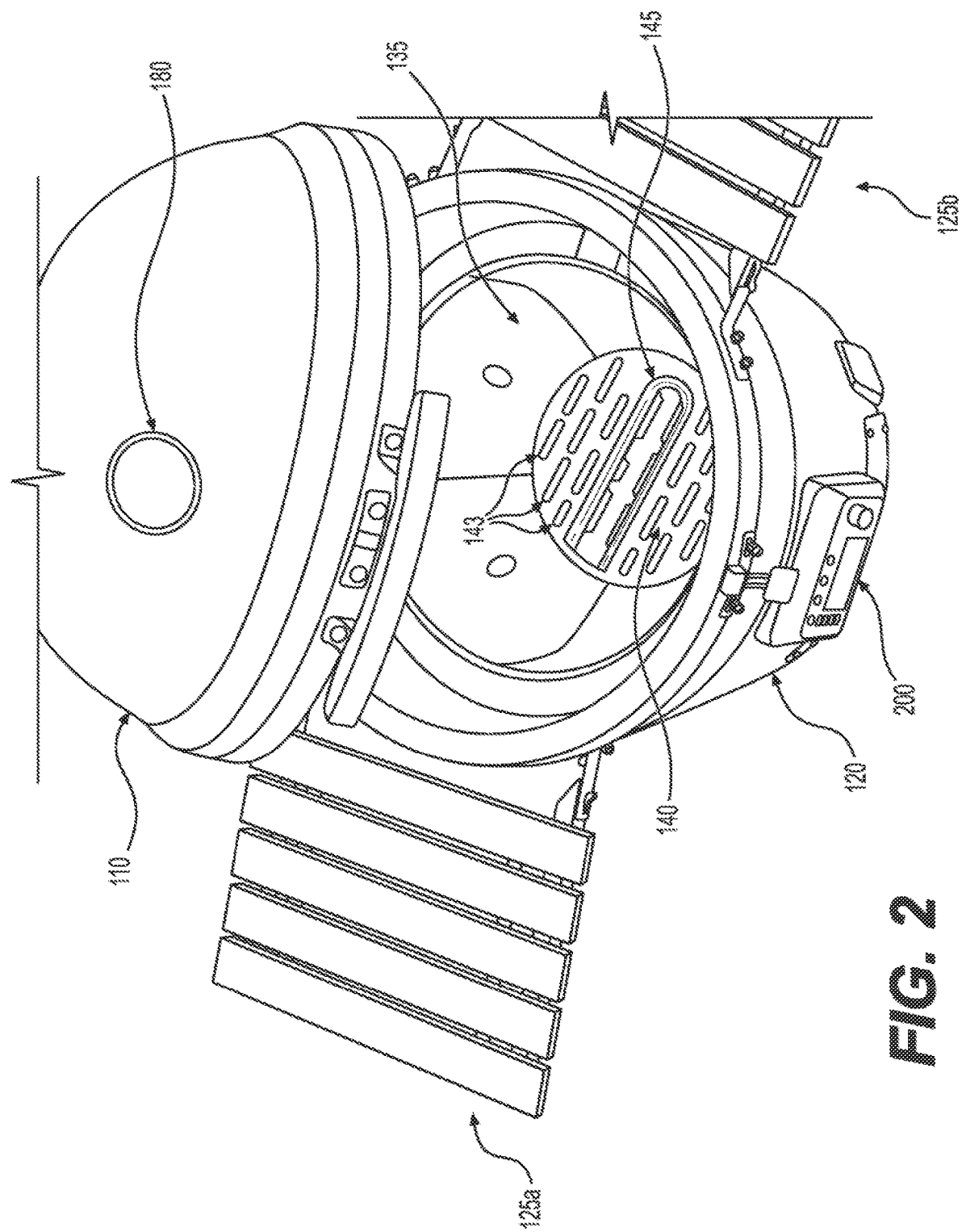
FIG. 2 is a top perspective view of the exemplary kamado-style grill and smoker in FIG. 1 that may be used in accordance with certain disclosed embodiments.

FIG. 2 illustrates a top perspective view, looking down into the bottom shell 120, when the cooking rack 130 has been removed. As FIG. 2 shows, the exemplary kamado-style grill and smoker 100 includes a firebox 135 positioned within the interior of the bottom shell 120. The firebox 135 is configured to hold the charcoal, wood, and/or other fuel or starter materials used to generate heat for cooking and/or smoking food products in the cooking chamber. Although not shown in FIG. 2, one or more heat deflectors or other heat-diffuser materials may be positioned within the interior of the bottom shell 120, preferably above the firebox 135 and below the cooking rack 130, to provide a more uniform heat distribution underneath the cooking rack 130 during operation of the grill.

Figure 7:
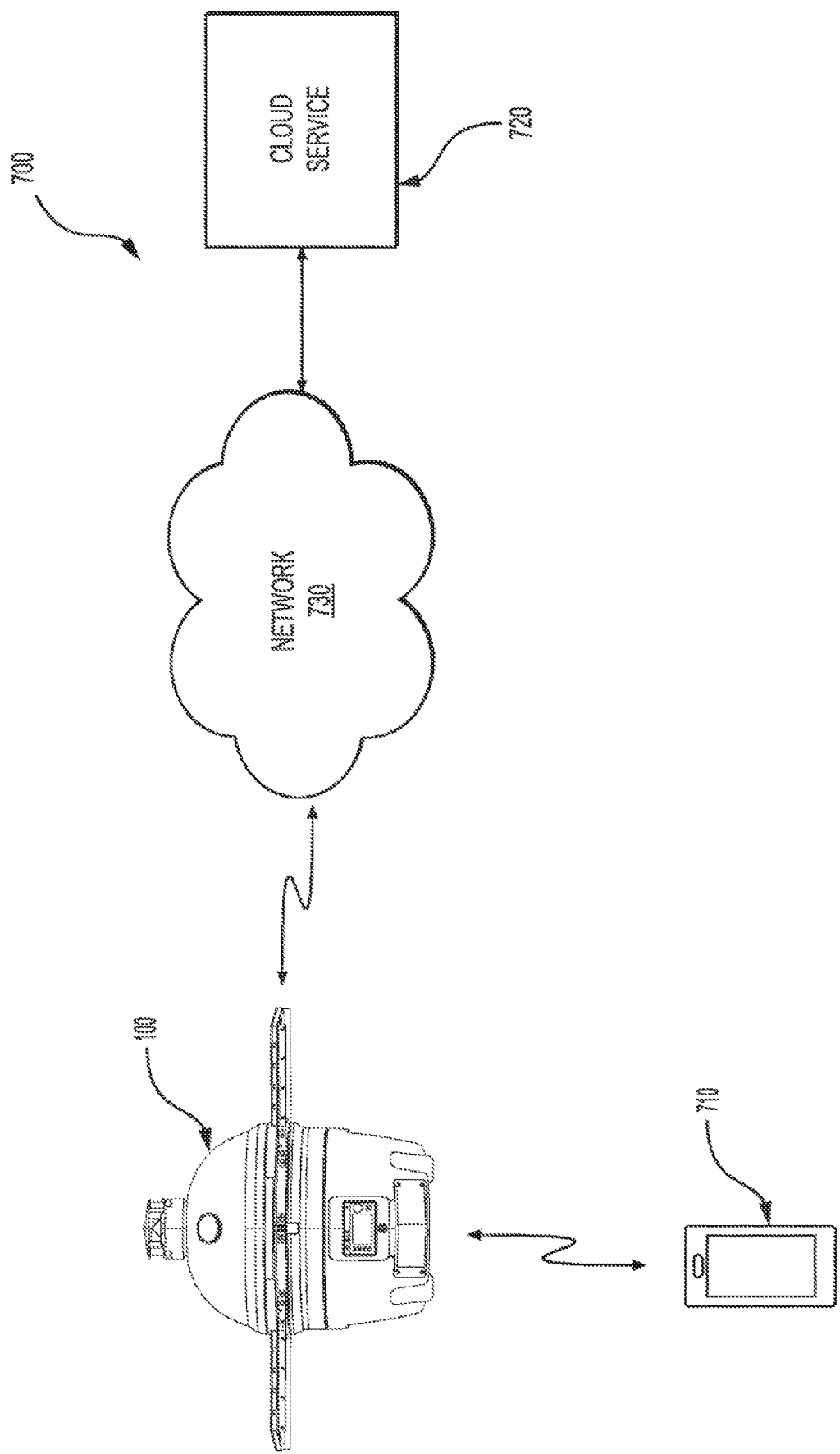
FIG. 7 is a schematic diagram illustrating an exemplary network architecture in which the kamado-style grill and smoker in FIG. 1 may be configured to wirelessly communicate with a user device and also wirelessly communicate via a network with one or more remote computers, for example that provide a cloud service in a cloud computing platform, in accordance with certain disclosed embodiments.

The sides of the firebox 135 are preferably formed of a relatively thick ceramic or other refractory material to provide a rigid structure that efficiently retains heat during operation of the grill. In some embodiments, the firebox 135 may comprise a plurality of separable side pieces, for instance as shown and described in U.S. Pat. No. 10,520,189, which is hereby incorporated by reference as if set forth fully herein. The bottom surface of the firebox 135 preferably includes a fuel grate 140 on which the user may place the charcoal, wood, and/or other fuel or starter materials. The fuel grate 140 includes a plurality of openings 143 (as shown in FIG. 2) that allow air to flow from below the fuel grate 140 through the grate in order to oxidate and maintain combustion of the fuel. In the exemplary kamado-style grill and smoker 100, the fuel grate 140 further includes an ignition component 145 that may be used to generate a relatively large amount of heat to start combustion of the fuel and/or starter materials positioned on the fuel grate 140. For example, the ignition component 145 may generate heat by passing electrical current through it. The ignition component 145 is used only temporarily to generate enough heat to ignite the fuel in the firebox 135. The ignition component 145 may automatically ignite the charcoal, wood, or other fuel in response to a user pushing a button 300 (FIG. 3A) or a user sending an ignition command from a remote device to a control unit 200 associated with the kamado-style grill and smoker as described below (FIG. 7).

In the exemplary embodiment of FIG. 1, the bottom shell 120 includes an air-intake opening, for example located toward the front of the grill, that a user can selectively cover and uncover by manually positioning a slidable door 160 ("draft door") over the opening. By sliding the door 160 to different lateral positions, the user can select a desired aperture size that allows air to flow through the opening in the bottom shell and into the cooking chamber. In alternative embodiments, different types of manually-adjustable air-intake openings may be implemented in the bottom shell 120. For example, the bottom shell 120 alternatively may include a set of holes that can be selectively covered and uncovered to allow outside air to pass through the holes and into the cooking chamber. The door 160 preferably is coupled to a proximity sensor (not shown), such as but not limited to a Reed sensor, optical sensor, or any other type of sensor that can detect when the door 160 is not fully closed. The sensor may generate an output signal indicating whether the door 160 is fully closed and may be configured to provide the output signal to the control unit 200 as described below.

In FIG. 1, the top shell 110 includes a top vent 170 that may be attached to a chimney formed on the top shell. The aperture size of at least one exhaust opening in the top vent 170 may be adjusted, for example, by selectively covering and uncovering one or more openings in the top vent. Smoke and other exhaust gases from inside the cooking chamber can escape through the exhaust opening(s) in the top vent 170. In some embodiments the aperture size of the exhaust openings in the top vent 170 may be controlled by an actuator that receives control signals from the control unit 200.

The top shell 110 may include an analog or digital temperature display 180 indicating an air temperature within the cooking chamber. The display 180 may be connected to a thermocouple, RTD, or other temperature sensor located on or close to the interior surface of the top shell. The top shell 110 also may include at least one other temperature sensor 185 (FIG. 3B), for example, a thermocouple, RTD, or other temperature sensor configured to generate a signal corresponding to an air temperature that can be sent to the control unit 200.

In FIG. 1, the exemplary kamado-style grill and smoker 100 includes optional shelves 125a and 125b. The exemplary kamado-style grill and smoker is also seated in an optional wheeled cart 150 that may be used to more easily transport the grill, for example, around a deck or patio. As shown, the optional shelves 125a and 125b may be attached to the bottom shell 120. In some embodiments, the optional shelves could be attached or combined with the optional cart 150 or another surface on which the kamado-style grill and smoker is placed.

Figure 3A:
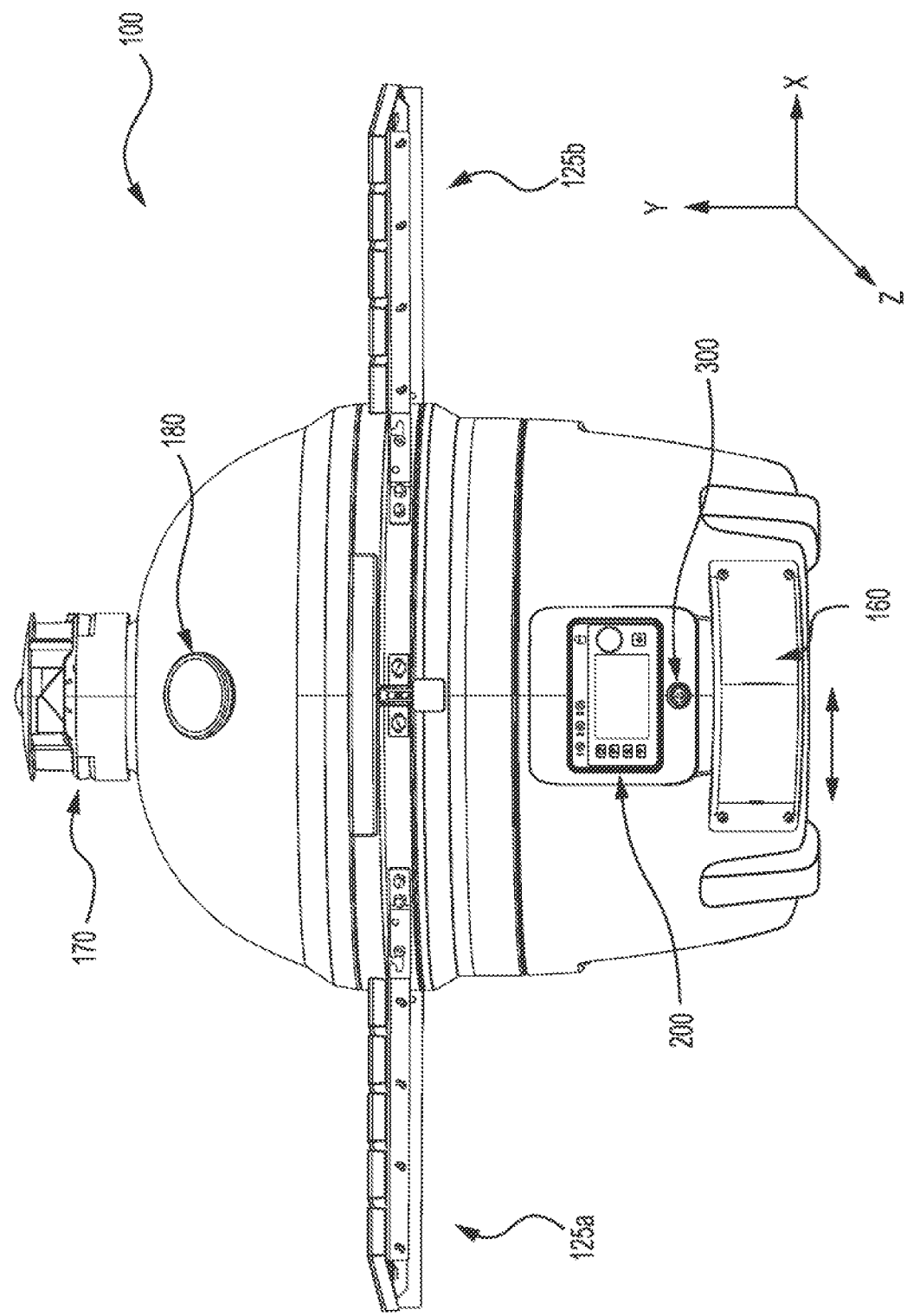
FIG. 3A is a front view of the exemplary kamado-style grill and smoker in FIG. 1 with its top shell (cover) closed over its bottom shell (base) which may be used in accordance with certain disclosed embodiments.
Figure 3B:
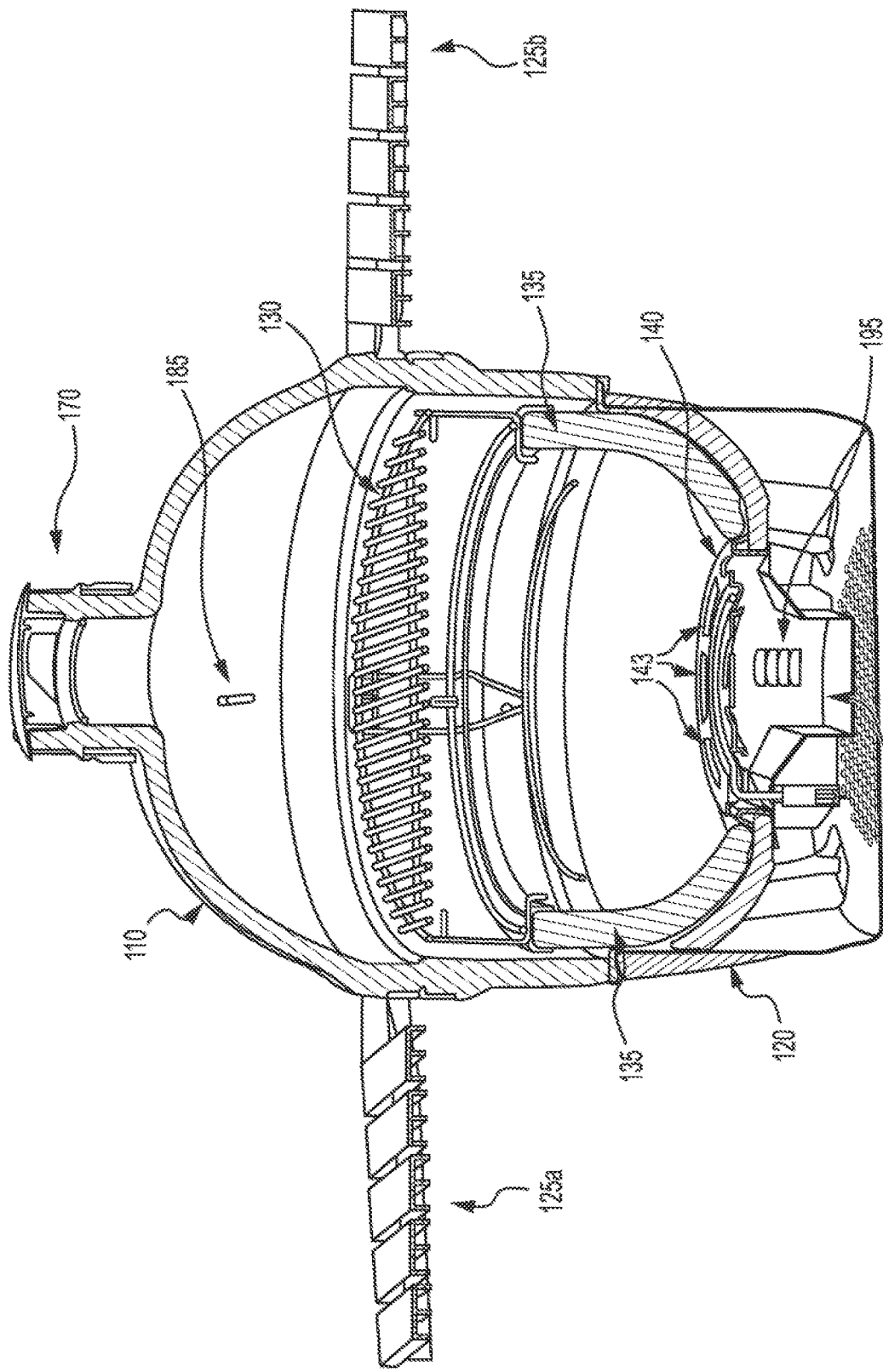
FIG. 3B is a front cross-sectional view of the exemplary kamado-style grill and smoker in FIG. 3A that may be used in accordance with certain disclosed embodiments.

FIG. 3A shows the exemplary kamado-style grill and smoker 100 when its top shell 110 is closed over its bottom shell 120. FIG. 3B is a cross-sectional view of the kamado-style grill and smoker in FIG. 3A in the x-y plane (as defined in FIG. 3A) taken along an axis passing approximately through the middle of the grill 100. As FIG. 3B shows, an ash deposit unit 190 may be positioned under the fuel grate 140 to collect ash that falls through the grate as the charcoal, wood, or other fuel is consumed. In some embodiments. The ash deposit unit 190 may comprise a removable tray that a user can access through the slidable door 160.

In addition to the air-intake pathway that allows air to flow into the cooking chamber by manually adjusting the position of the slidable door 160 over an opening at the front of the bottom shell 120, the exemplary kamado-style grill and smoker 100 further includes a second air-intake pathway located near the rear of the bottom shell 120. Unlike the first air-intake pathway where a user can manually adjust an aperture size of an air-intake opening by opening or closing the door 160 while cooking or smoking food products in the kamado-style grill and smoker 100, the second air-intake pathway is not manually adjustable because the second air-intake pathway cannot be opened or closed to the passage of air based on a user's manipulation of any mechanical components (such as a draft door) during operation of the kamado-style grill. In FIG. 3B, for example, this second air-intake pathway may comprise an air inlet having a set of openings 195 that allow air to flow into the cooking chamber. In the exemplary embodiment of FIG. 3B, the set of openings 195 may comprise one or more openings through a base of the firebox 135 and/or through a rear wall of the ash deposit unit 190. The openings 195 may be louvred, as shown, to help prevent ash from entering a fan outlet 950 located behind the louvred inlet as discussed in more detail below. However, the second air-intake pathway alternatively may be implemented with one or more holes or other types of openings 195 (not louvred) through the rear surface of the firebox 135 and/or ash deposit unit 190.

In accordance with the disclosed embodiments, an integrated fan unit 800, described with reference to FIGS. 8-10B, may be positioned behind the one or more openings 195 in the second air-intake pathway. The integrated fan unit 800 is configured to force air through the one or more openings 195 and into an area of the bottom shell 120 located below the fuel grate 140. The air flow from the integrated fan unit can pass from the area underneath the grate 140, through the openings 143, to feed combustion of the fuel positioned on the grate's top surface. When the charcoal, wood, or other fuel is ignited on the grate 140, the control unit 200 may automatically control the temperature in the cooking chamber by controlling the amount of air that the integrated fan unit 800 forces into the area below the grate 140.

Further to the disclosed embodiments, air flow through the second air-intake pathway, e.g., output from a fan 900 in the integrated fan unit 800, passing through a fan outlet 950, and through the one or more openings 195, may be selectively sealed or otherwise closed off, for example by an adjustable flap, door, shutter, or cover controlled by the control unit 200. In some embodiments, for example, an adjustable flap in the second air-intake pathway may provide a barrier to air flow when the integrated fan unit 800 is turned off, and may allow a selected amount of air flow through the second air-intake pathway as a function of a fan speed controlled by the control unit 200. In some embodiments, the control unit 200 may be configured to block air flow through the second air-intake pathway, for example, when the slidable door 160 is not fully closed or the user has not selected to use the temperature regulation apparatus.

In the exemplary kamado-style grill and smoker 100, outside air may enter the area of the cooking chamber below the fuel grate 140 either from a first air-intake pathway through the slidable door 160 (when it is at least partially open) at the front of the bottom shell 120 or through a second air-intake pathway through the one or more openings 195 (when they are at least partially open) at the rear of the bottom shell 120. While the relative positions of these alternative air-intake pathways are generally shown at the front and rear of the bottom shell 120, those skilled in the art will appreciate these different air-intake pathways may be implemented at any other locations on the bottom shell 120.

FIGS. 4A and 4B illustrate an exemplary control unit 200 that may be used in accordance with certain disclosed embodiments. In FIG. 4A, the control unit 200 may be preferably mounted in a recessed area 400 in the bottom shell 120, although the control unit 200 alternatively may be mounted at other locations, for example, on the top shell 110, bottom shell 120, shelves 125a,b, cart 150, or any other location whether recessed or not. FIG. 4B shows an embodiment of the control unit 200 which may be detachably connected to the recessed area 400. In this example, the recessed area 400 contains one or more magnets 450 or other connectors that interact with a corresponding set of one or more magnets or connectors on a rear surface of the control unit 200 that hold the control unit in place.

In FIGS. 4A-B, an ignition button 300 that the user may engage to automatically ignite the fuel within the kamado-style grill and smoker 100 is located on a raised bevel around the periphery of the recessed area 400. The button 300 is connected to the circuitry and/or logic that controls heat generation of the ignition component 145 in the grate 140. In some embodiments, when the user presses the button 300, the button may provide a signal to the control unit 200 which, in turn, controls the circuitry and/or logic for generating heat in the ignition component 145. In other embodiments, the ignition button 300 may be implemented as a user input on the control unit 200 instead of as a button that is separate from the control unit.

The control unit 200 (which also may be referred to as controller 200) may comprise one or more physical processors, such as a microprocessor, microcontroller, digital signal processor, field programmable gate array, application specific integrated circuit, or the like, and may further include at least one non-transitory memory device for storing associated software or firmware, configured to control at least some operations of the one or more physical processors in accordance with the disclosed embodiments described herein. The control unit 200 also comprises a plurality of input/output ("I/O") connections, for example interconnected with the one or more physical processors by a system bus, for communicating with other components in the kamado-style grill and smoker 100. The control unit 200 may, among other things, receive various user inputs and sensor signals and transmit control signals to the integrated fan unit 800 and other components in accordance with the disclosed embodiments described herein.

The control unit 200 preferably comprises at least one wireless transceiver configured to wirelessly communicate with one or more remote devices using any conventional wireless protocols, such as Bluetooth, ZigBee, or other protocols known in the art. The control unit 200 also may include a wireless transceiver configured to communicate with over an IEEE 802.11 ("Wi-Fi") network, a cellular network, or any other wireless network. Those skilled in the art will appreciate each wireless transceiver in the control unit 200 is coupled to one or more respective antennas and other transmitter and receiver circuitry required to effect wireless communications. In some embodiments, the at least one wireless transceiver may be further configured to wirelessly communicate with the integrated fan unit 800. In some embodiments, the control unit 200 also may be connected over wired connections to one or more sensors (e.g., one or more meat probes or temperature sensors), the integrated fan unit 800, or other components in the kamado-style grill and smoker 100 depending on the control unit's relative proximity to those components.

Figure 5:
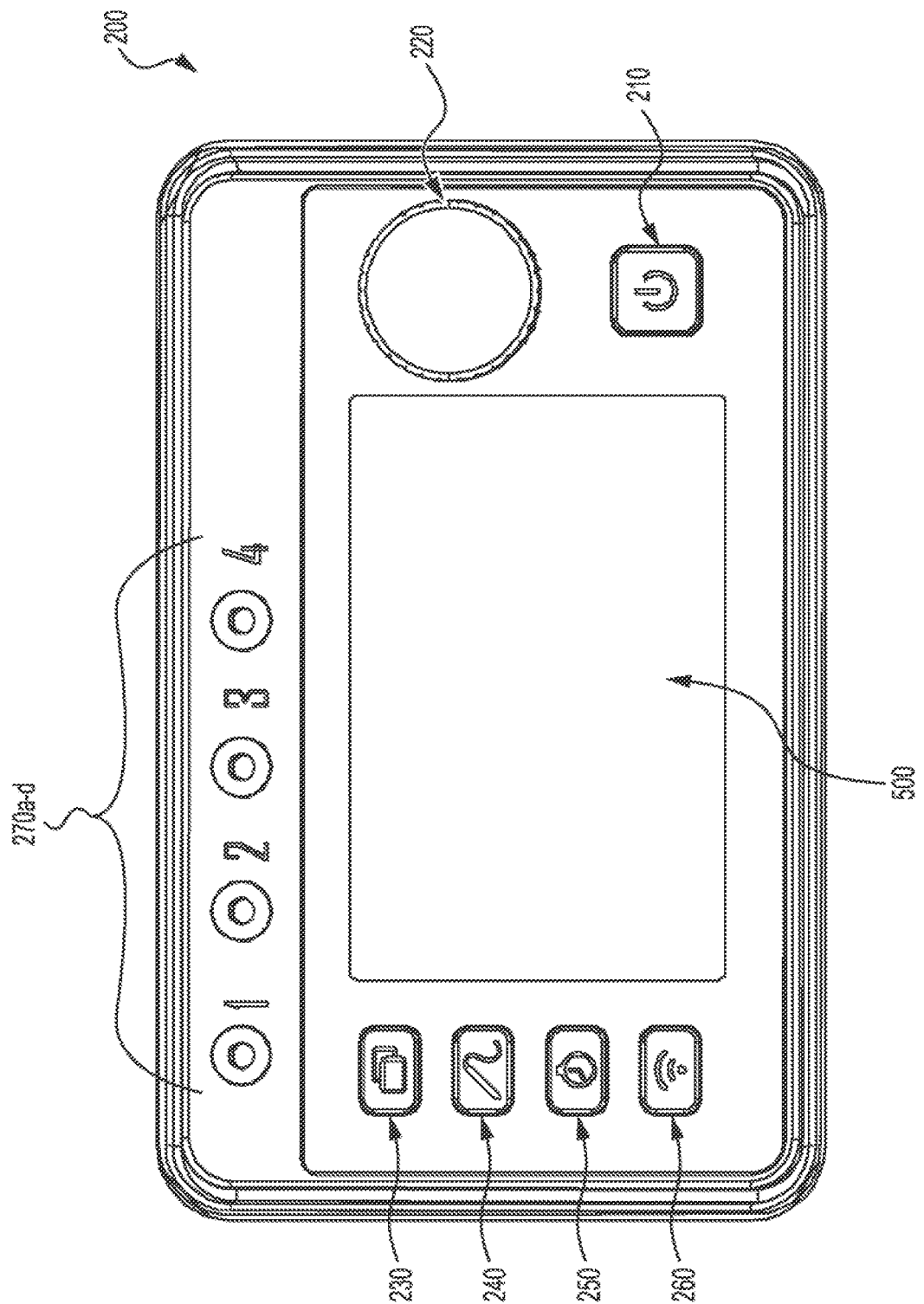
FIG. 5 depicts exemplary user-interface components and a display unit that may be implemented on the control unit of FIG. 4 in accordance with certain disclosed embodiments.

FIG. 5 illustrates the control unit 200 with an exemplary set of user-interface components 210-260 and a display unit 500 that may be used in accordance with certain disclosed embodiments. The control unit 200 includes, for example, a power button 210, a user input device 220, a temperature button 230, a meat probe button 240, a timer button 250, a wireless-connectivity button 260, and one or more meat-probe inputs 270a-d. In some embodiments, the display unit 500 may comprise a touchscreen through which the user may input information. In such alternative embodiments, one or more of the buttons 210-260 may be implemented as software-implemented buttons on the display unit's touchscreen.

The power button 210 may be used to turn on and off the control unit 200. The control unit 200 may be powered by one or more batteries in the control unit, or alternatively, it may receive power from an external power source. In the disclosed embodiments, the kamado-style grill and smoker 100 may include a power supply module, for example located in the integrated fan unit 800, that is configured to connect to an alternating current ("AC") power cord supplying electrical power for the control unit 200 and/or other components in the grill.

The user input device 220 allows a user to navigate user-interface screens displayed on the display unit 500 and also allows the user to enter information into appropriate fields of the user interface screens. The user input device 220 may be implemented as one or more different types of input devices, including but not limited to an alphanumeric keypad, a set of directional arrow keys, a touchpad, one or more input dials, switches, buttons, and so forth. In the exemplary embodiment of FIG. 5, the user input device 220 is implemented as a rotatable dial that allows a user to scroll through alphanumeric values and/or menu items selectable on one or more user-interface screens displayed on the display 500.

The temperature button 230 may be used to display on the display unit 500 a measured temperature in the cooking chamber of the kamado-style grill and smoker 100. The control unit 200 may determine the temperature to display based on one or more temperature sensors in the kamado-style grill, such as but not limited to the temperature sensor 185 positioned on an interior surface of the top shell 110.

Figure 6A:
FIG. 6A shows an exemplary user-interface screen that may be displayed to a user on the display unit of the exemplary control unit in FIG. 5 to set a target cooking or smoking temperature inside a cooking chamber of the kamado-style grill and smoker in accordance with certain disclosed embodiments.

In response to a manual, tactical, or haptic indication from the user, such as long-pressing the temperature button 230, or double-pressing the button 230, the control unit 200 may display a user-interface screen 610 (FIG. 6A) on the display unit 500 to allow the user to select a target temperature for the control unit 200 to maintain in the cooking chamber. This may correspond to a mode of operation in which the control unit 200 cooperates with the integrated fan unit 800 to automatically control an amount of air flowing through the cooking chamber to maintain the user's target temperature. In accordance with the disclosed embodiments, the control unit 200 may be required to determine, based on a received signal from a sensor coupled to the front door 160, that the door 160 is completely closed before the control unit will operate the kamado-style grill in an automated temperature control mode.

The control unit 200 includes a set of meat-probe inputs 270a, 270b, 270c, and 270d, each of which may receive a wired connection to a meat-probe temperature sensor. The user may choose to use any one or more of the meat-probe inputs 270a-d or none at all. In practice, the user may insert a meat probe into a food item in the cooking chamber and plug the other end of the meat probe into one of the inputs 270a-d. The control unit 200 may be configured to monitor the internal temperature of the food item based on the signal it receives at the meat-probe input.

The meat-probe button 240 may be used to display on the display unit 500 a measured internal temperature of a food item in the cooking chamber of the kamado-style grill and smoker 100. The control unit 200 may determine the temperature to display based on a signal it receives at the one or more meat-probe inputs 270a-d. The user may press the meat-probe button 240 multiple times to scroll through different display screens corresponding to measured temperatures for different meat probes.

Figure 6B:
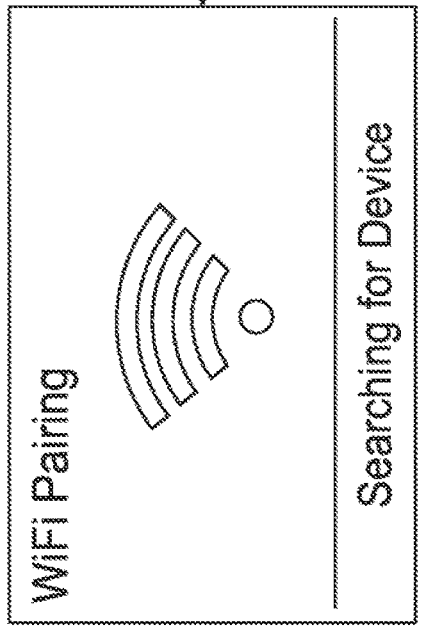
FIG. 6B shows an exemplary user-interface screen that may be displayed to a user on the display unit of the exemplary control unit in FIG. 5 to set a target internal temperature for a food product being cooked or smoked in the kamado-style grill and smoker in accordance with certain disclosed embodiments.

In response to the user long-pressing the meat-probe button 240, or double-pressing the button 240, the display unit 500 may display a user-interface screen 620 that allows the user to select a target temperature for a particular meat probe input (such as "Meat Probe 1" as shown in FIG. 6B). This target temperature may be used by the control unit 200 to send control signals to the integrated fan unit 800 for automatically controlling an amount of air flowing through the cooking chamber to maintain the user's target meat-probe temperature.

Figure 6C:
FIG. 6C shows an exemplary user-interface screen that may be displayed to a user on the display unit of the exemplary control unit in FIG. 5 to set a countdown timer and/or alarm for cooking or smoking food using the kamado-style grill and smoker in accordance with certain disclosed embodiments.

The timer button 250 may be used to display on the display unit 500 a countdown timer 630 (FIG. 6C) that the user can use to monitor the grilling or smoking time. The control unit 200 may be configured to sound an audio alarm or otherwise provide any type of audio and/or visual feedback to the user indicating when the timer expires.

Figure 6D:
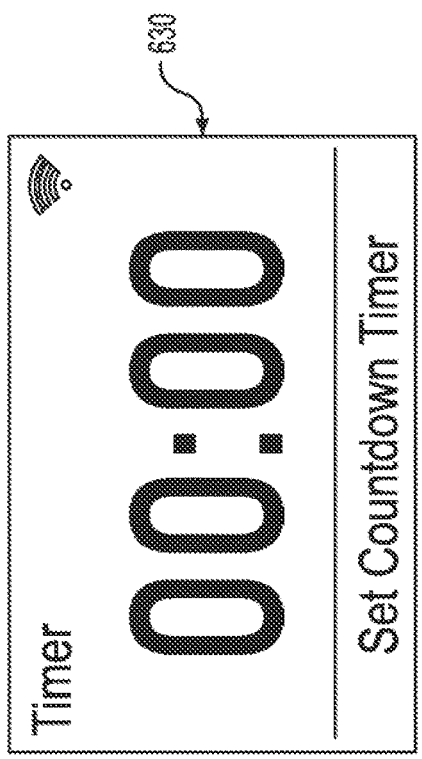
FIG. 6D shows an exemplary user-interface screen that may be displayed to a user on the display unit of the exemplary control unit in FIG. 5 to connect the kamado-style grill and smoker to a remote device or computer over a wireless network or direct wireless connection in accordance with certain disclosed embodiments.

The wireless-connectivity button 260 may be used to establish a wireless connection between the control unit 200 and a remote device, such as by pairing the control unit 200 to a user device through a Bluetooth connection. The control unit may display a user-interface screen 640 (FIG. 6D) showing the status of the wireless connection. After the user turns on the control unit 200, for example by pressing the power button 610, the control unit 200 preferably connects automatically to an available local area network, such as through a Wi-Fi access point, or to a cellular network if it cannot successfully connect to a local area network. After being turned on, the control unit 200 also connects automatically to the integrated fan unit 800 over a wireless connection, except in those embodiments where the control unit has wired connections to the integrated fan unit. The state and/or strength of the control unit's Wi-Fi or cellular connection may be represented by an icon displayed to the user on the display unit 500 (such as shown in the upper-right-hand corner of FIGS. 6A-C).

Figure 6E:
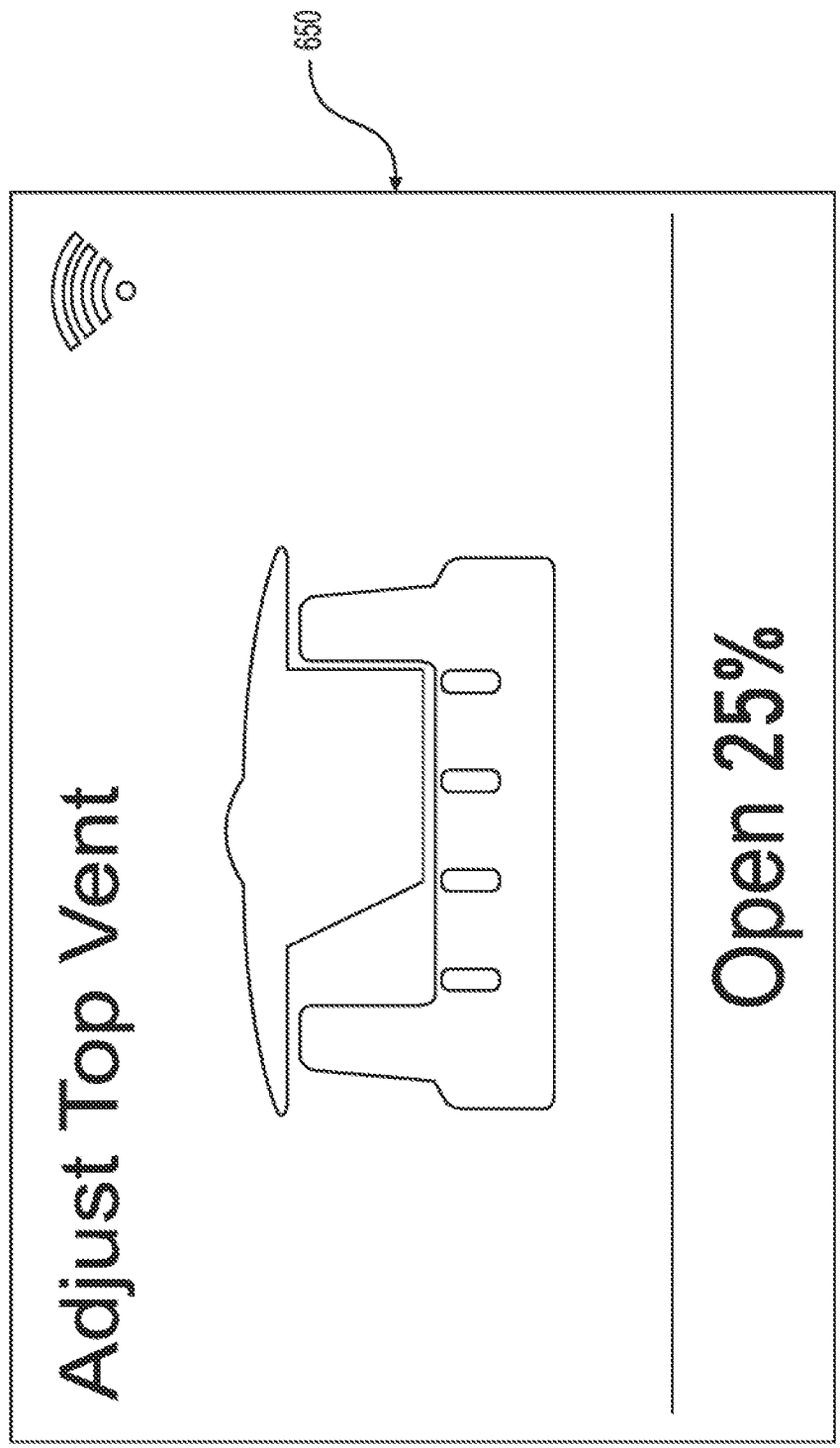
FIG. 6E shows an exemplary user-interface screen that may be displayed to a user on the display unit of the exemplary control unit in FIG. 5 to notify the user of an aperture size of one or more exhaust openings on the kamado-style grill and smoker in accordance with certain disclosed embodiments.

The control unit 200 also may display other user-interface screens on the display unit 500, depending on its implementation. For example, the control unit 200 may display a screen 650 (FIG. 6E) indicating an aperture size of at least one exhaust opening in the top vent 170. In some embodiments, the displayed aperture size of the at least one exhaust opening may be a recommended size or percentage to guide the user in manually adjusting the top vent 170. In other embodiments, the control unit may be configured to control the aperture size of the exhaust opening in the top vent, for example, by providing control signals to an actuator that rotates or otherwise adjusts the size of one or more exhaust openings in the top vent 170. In some embodiments, the control unit 200 may receive a signal from a sensor indicating a measured aperture size or percentage of one or more openings in the top vent 170 to display to the user on the display unit 500.

FIG. 7 is a schematic diagram illustrating an exemplary network architecture 700 in which the kamado-style grill and smoker 100 may be configured to wirelessly communicate with a user device 710 and also may be configured to wirelessly communicate via a network 730 with one or more remote computers that provide a cloud service 720 in a cloud computing platform in accordance with certain disclosed embodiments. For example, the user may have a mobile device, such as a smartphone, tablet, laptop, or other user equipment, or another type of remote device, such as a desktop or appliance, that can establish a wireless connection with the control unit 200. The user device 710 may be configured to communicate with the control unit 200 over a peer-to-peer wireless connection, such as over a Bluetooth connection, or over a local area network, such as a Wi-Fi network. In some embodiments, the user may press the wireless-connectivity button 260 to initiate the establishment of a wireless connection between the control unit 200 and user device 710.

The control unit 200 also may establish a network connection with one or more remote servers through a network 730, which may be a public network such as the Internet. For example, the control unit 200 may be configured to communicate packet-based information with one or more remote servers using Internet protocols, such as HTTP and TCP/IP. In some embodiments, the control unit 200 preferably accesses at least one cloud-based service 720 on the one or more remote servers through the network 730. The cloud-based service 720 may provide certain database services for managing data collected by sensors in the kamado-style grill and smoker 100 and other information generated or collected by the control unit 200 or other components in the kamado-style grill and smoker 100. In addition, the cloud-based service 720 may provide data, commands, and/or instructions to the control unit 200, for example, that may be used by the control unit to implement a strategy for controlling an amount of air flow in the cooking chamber using the integrated fan unit 800.

In some embodiments, the control unit 200 may be configured to receive user inputs from the user device 710 rather than from the buttons 210-260. For example, the user device 710 may execute an application that provides a user interface which allows the user to input selections corresponding any or all of the buttons 210-260. The user device 710 may be configured to transmit such user inputs over the wireless connection to the control unit 200, which processes the received user inputs in the same way as it would if they had been received directly from the buttons 210-260. For example, the user may select a target temperature for the cooking chamber or a target temperature for a particular meat probe using the application on the user device 710, then the user device 710 may send the user's selected target temperature to the control unit 200 over a Bluetooth connection or a Wi-Fi network. In some embodiments, the user may use the application on the user device 710 to send an ignition command to the control unit 200 to ignite the fuel on the fuel grate 140 in the cooking chamber.

Further, the application executing on the user device 710 may display the same or similar user-interface screens, such as in FIGS. 6A-E, that the control unit 200 displays on the display unit 500. In some embodiments, the same information may be displayed by user-interface screens on both the user device 710 and the display 500 at the same time; in other embodiments, the display unit 500 may be deactivated if the control unit 200 determines that the user is receiving the same or similar user-interface screens through the user device 710.

Figure 8A:
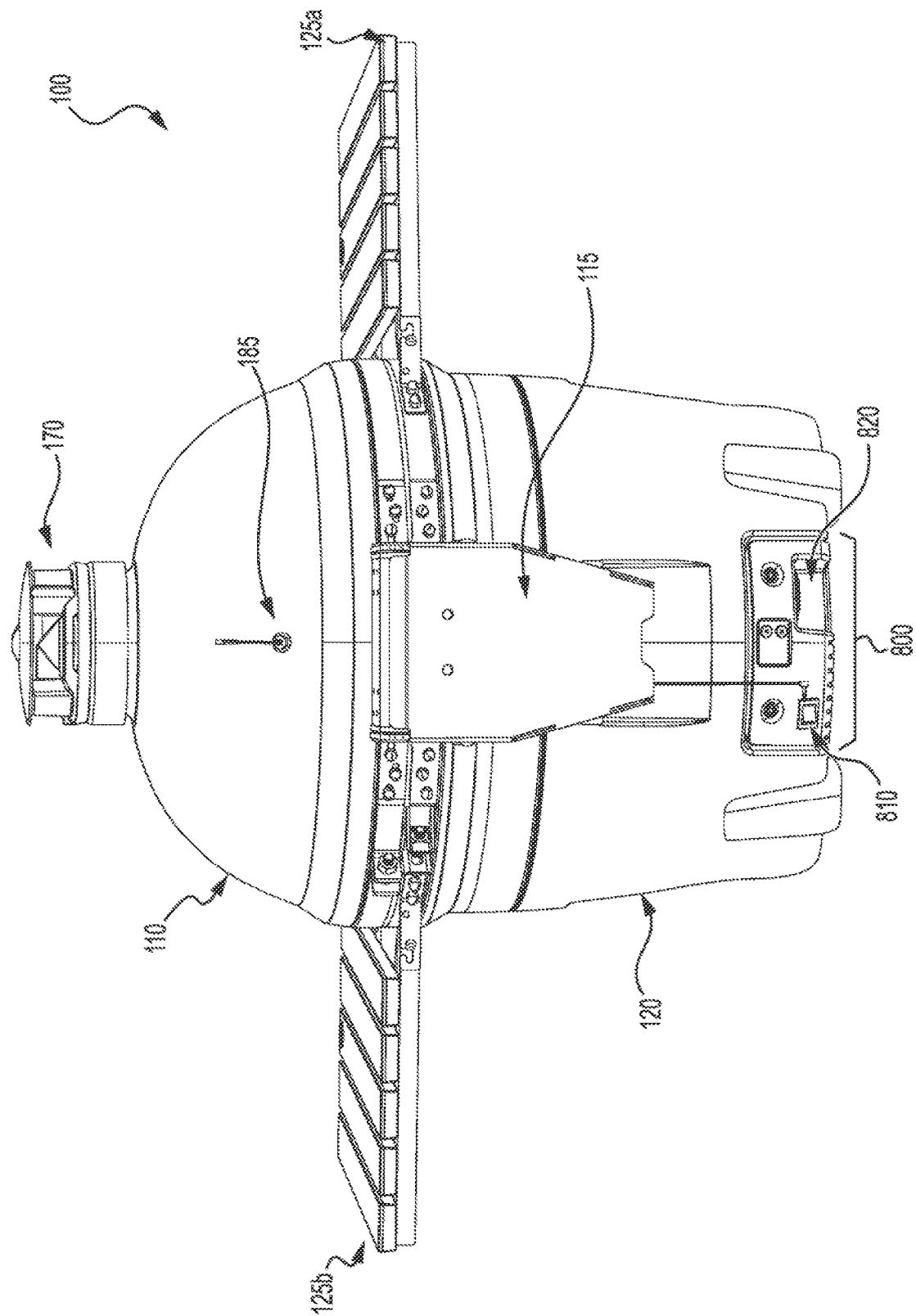
FIG. 8A is a rear view of the exemplary kamado-style grill and smoker in FIG. 1 with its top shell (cover) closed over its bottom shell (base), and a temperature regulation apparatus integrated into the bottom shell, in accordance with certain disclosed embodiments.

FIG. 8A is a rear view of the exemplary kamado-style grill and smoker 100 with the top shell 110 closed over the bottom shell 120, and the integrated fan unit 800 installed in the bottom shell in accordance with certain disclosed embodiments. The integrated fan unit 800 may be attached to the bottom shell 120 using a pair of screws or bolts 830 (FIG. 9) or via any other securing mechanisms that would be understood to those skilled in the art. The integrated fan unit 800 preferably comprises an on/off switch 810 and a connector 820 where the user can connect a power cord to the integrated fan unit 800. The integrated fan unit also preferably includes a power supply module that converts the received power into one or more operating voltages for the fan 900 and other electronics within the integrated fan unit.

FIG. 8B is also a rear view of the kamado-style grill and smoker 100, but removes the outer cover of the integrated fan unit 800 to show its fan 900. In some embodiments, the fan 900 may be a centrifugal fan or any other type of fan that may be positioned directly behind the one or more openings 195 and configured to force air through those openings and into the cooking chamber. To that end, the fan 900 may comprise a fan outlet 950 that directs air from the fan toward the one or more openings 195. In some embodiments, a high-temperature gasket material 960 may be fitted around the fan outlet 950 to provide a compression seal at the interface between the fan outlet 950 and the bottom-shell surface containing the openings 195, thereby ensuring that air output from fan 900 is forced to pass through the one or more openings 195.

As shown in FIG. 9, the integrated fan unit 800 includes at least one antenna 840 that may be used to communicate wirelessly with the control unit 200. In some embodiments, the integrated fan unit 800 may receive analog or digital control signals from the control unit 200 via the antenna 840. In alternative embodiments, the control unit 200 instead may be connected to the integrated fan unit 800 over wired connections or may be combined with the integrated fan unit in a single module, in which cases the antenna 840 would not be needed to receive commands from the control unit 200. The control signals sent from the control unit 200 to the integrated fan unit 800 may comprise one or more commands or instructions for controlling the fan 900, adjustable flap 1000, or any other components within the integrated fan unit.

In accordance with the disclosed embodiments, the control unit 200 may transmit control signals to the integrated fan unit 800 for controlling, for example, a speed of the fan 900, a timing or sequence for modulating when the fan 900 is turned on, and/or a position of an adjustable flap 1000 coupled to the fan outlet 950 (described below). The integrated fan unit 800 comprises at least a fan controller and other circuitry for controlling the operation of the fan 900 and/or the adjustable flap 1000 consistent with the control signals (e.g., commands) received from the control unit 200. To that end, the integrated fan unit 800 may comprise hardware components, such as one or more microcontrollers, digital signal processors, application specific integrated circuits, field programmable gate arrays, actuators, servo motors, and/or sensors for processing the control signals received from the control unit 200 and controlling the fan 900 and adjustable flap 1000 in accordance with the received control signals as described further below.

Figure 10A:
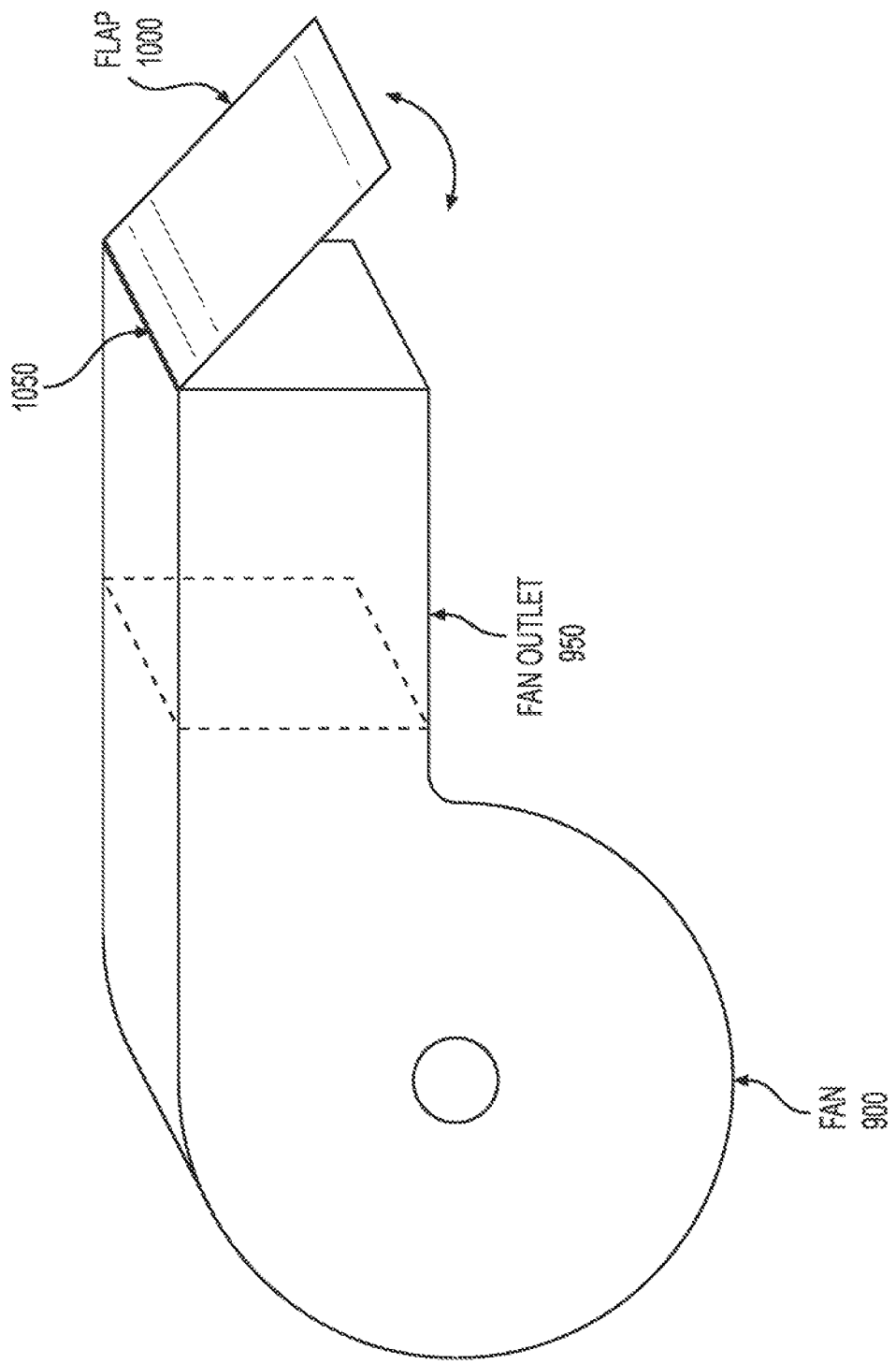
FIGS. 10A and 10B are schematic diagrams showing exemplary fans, fan outlets, and adjustable flaps that may be used in the integrated temperature regulation apparatus of FIG. 9 in accordance with certain disclosed embodiments.

FIG. 10A is a schematic diagram of a fan 900, fan outlet 950, and adjustable flap 1000 that may be used in accordance with certain disclosed embodiments. When it is turned on, the fan 900 is configured to force air through the fan outlet 950, which may be an air duct that is either a portion of the fan 900 or a component that is separately connected to the output of the fan 900. An adjustable flap 1000 may be attached to a hinge 1050 attached to the fan outlet 950. In the exemplary embodiment of FIG. 10A, the force of air output by the fan 900 on the adjustable flap 1000 can cause the flap to rotate about the hinge 1050. For example, the flap 1000 may be configured to change positions as a function of the speed of the fan 900 between a closed position where it blocks air flow through the fan outlet 950 and one or more open positions where the flap has changed positions to allow air to flow through the fan outlet. In some embodiments, the control unit 200 may provide one or more control signals to the integrated fan unit 800 to select a constant speed of the fan 900 and, thus, a desired position of the flap 1000. In alternative embodiments, the position of the flap may be selectively adjusted by an actuator, such as by a pulse width modulated ("PWM") motor or other actuator, that can selectively rotate the position of the flap 1000 about the hinge 1050 and maintain a constant flap position.

Figure 10B:
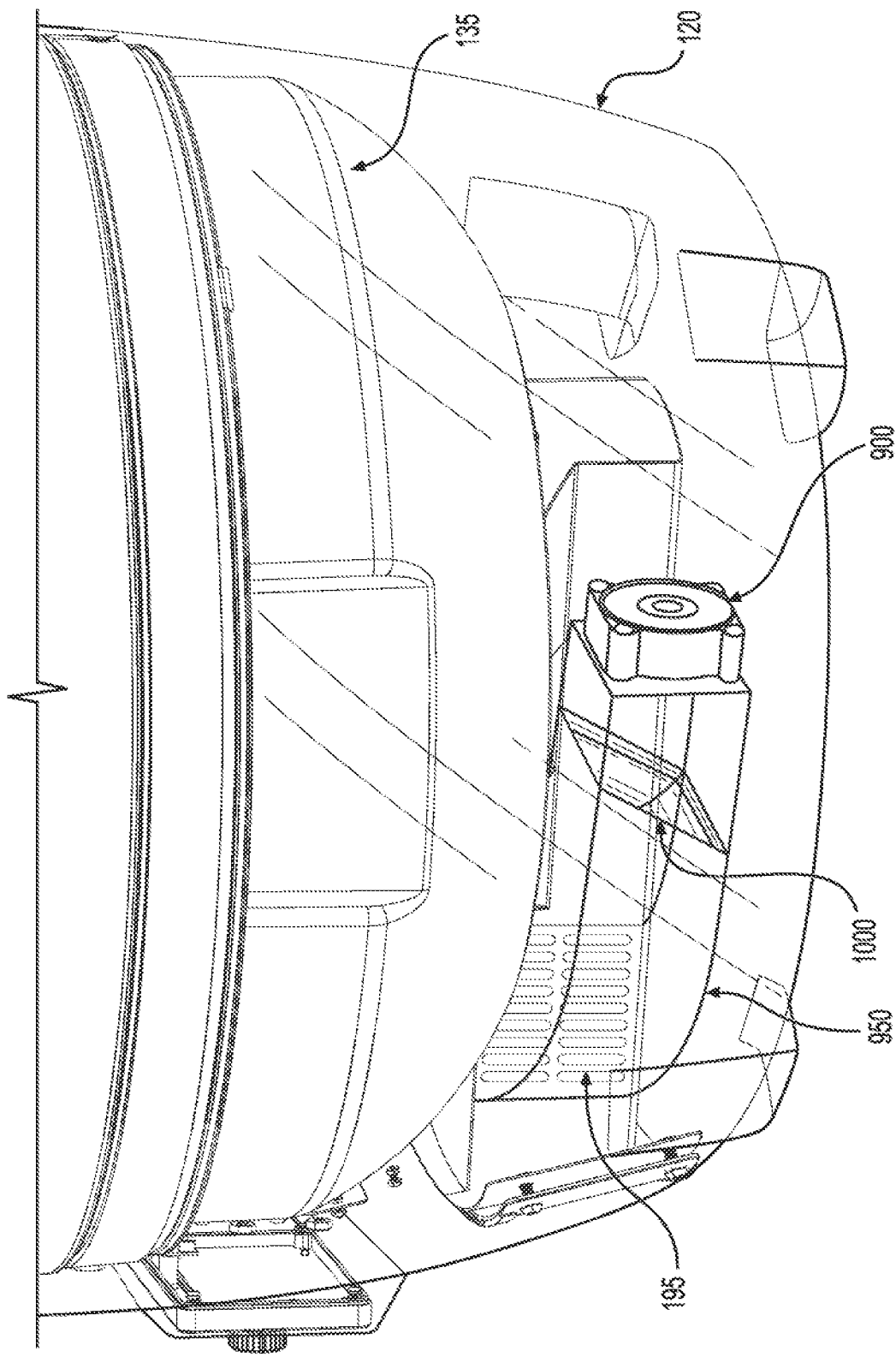

Those skilled in the art will appreciate that the adjustable flap 1000 may be implemented in many different ways, so long as it functions to selectively open and close the fan outlet 950. In this context, the fan outlet 950 is "closed" when its cross-sectional area is completely blocked and air cannot pass through the fan outlet; otherwise, the fan outlet is either "open" or "partially open" depending on the relative position of the flap 1000 as may be controlled, for instance, by the speed of the fan 900. Further, while FIG. 10A shows the flap 1000 can be connected by a hinge 1050 along a top edge of the fan outlet 950, the flap alternatively may be connected by a hinge along any other edge of the fan outlet. In alternative embodiments, the flap 1000 may be deployed within the body of the fan outlet 950 rather than at its distal end. FIG. 10B, for example, illustrates another exemplary embodiment where the adjustable flap 1000 is positioned within the body of the fan outlet 950. The flap 1000 alternatively could be replaced with other mechanisms for selectively opening and closing air passage through the fan outlet 950, such as by rotating a shutter or opening and closing holes located at the end or within the fan outlet 950. The flap 1000 may be any type of barrier that can be selectively positioned to block or allow air flow through the fan outlet.

Figure 11:
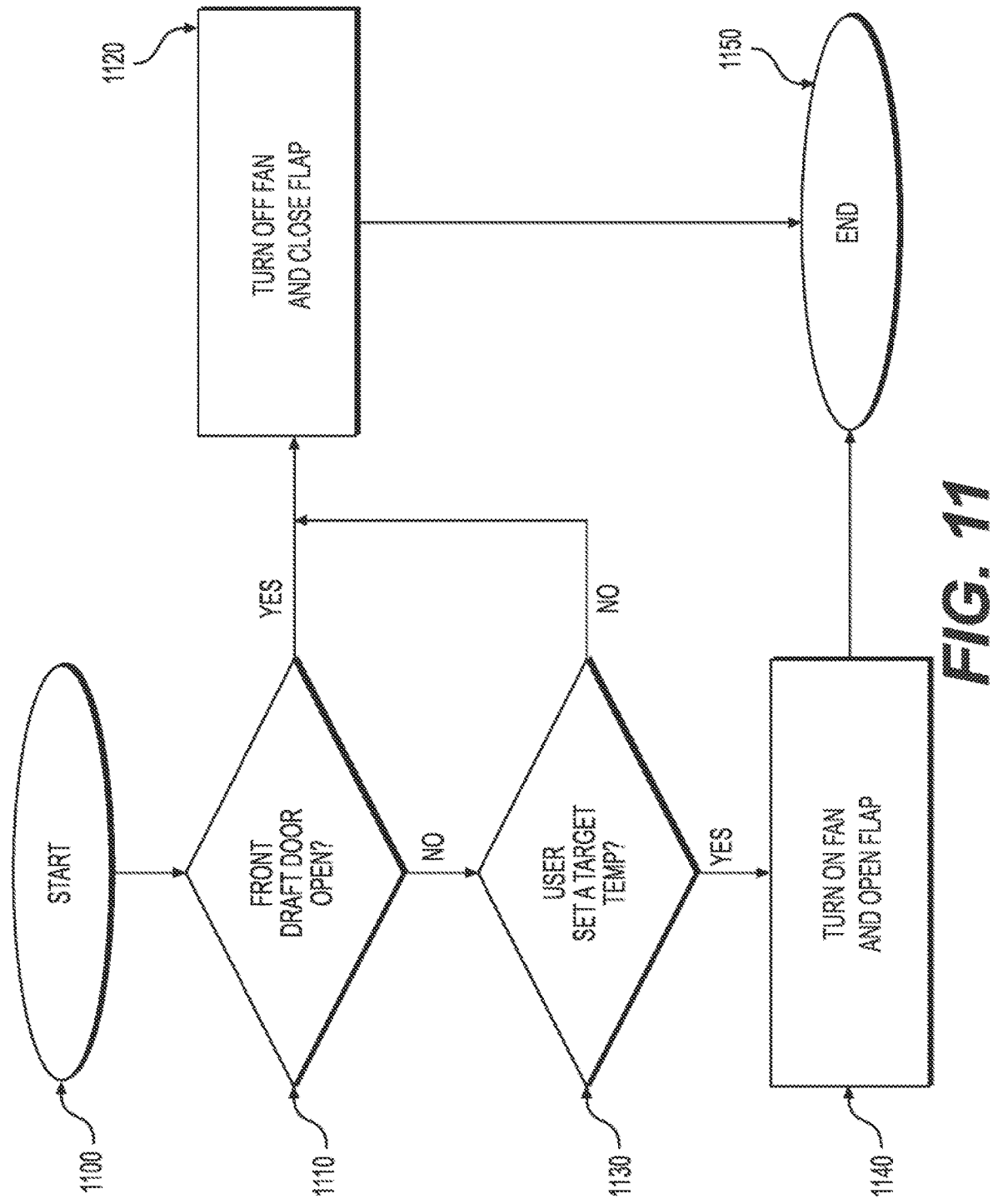
FIG. 11 is an exemplary flowchart illustrating an illustrative sequence of steps that may be performed by a control unit to control the operation of the integrated temperature regulation apparatus of FIG. 9 in accordance with certain disclosed embodiments.

FIG. 11 is a flowchart illustrating an exemplary sequence of steps that may be performed by the control unit 200 in accordance with certain disclosed embodiments. The sequence starts at step 1100 and proceeds to step 1110 where the control unit 200 determines whether the slidable door 160 is open, e.g., based on a received sensor signal at or near the door 160. The control unit 200 is configured not to permit automated control of the temperature in the cooking chamber when it determines that the slidable door is open. As such, the control unit 200 ensures that the fan 900 will not be turned on while the front slidable door is open. In this case, the cooking and smoking temperature in the kamado-style grill and smoker 100 can only be manually controlled through adjustment of the air-intake opening through the slidable door 160 and adjustment of the exhaust opening through the top vent 170.

Figure 12:
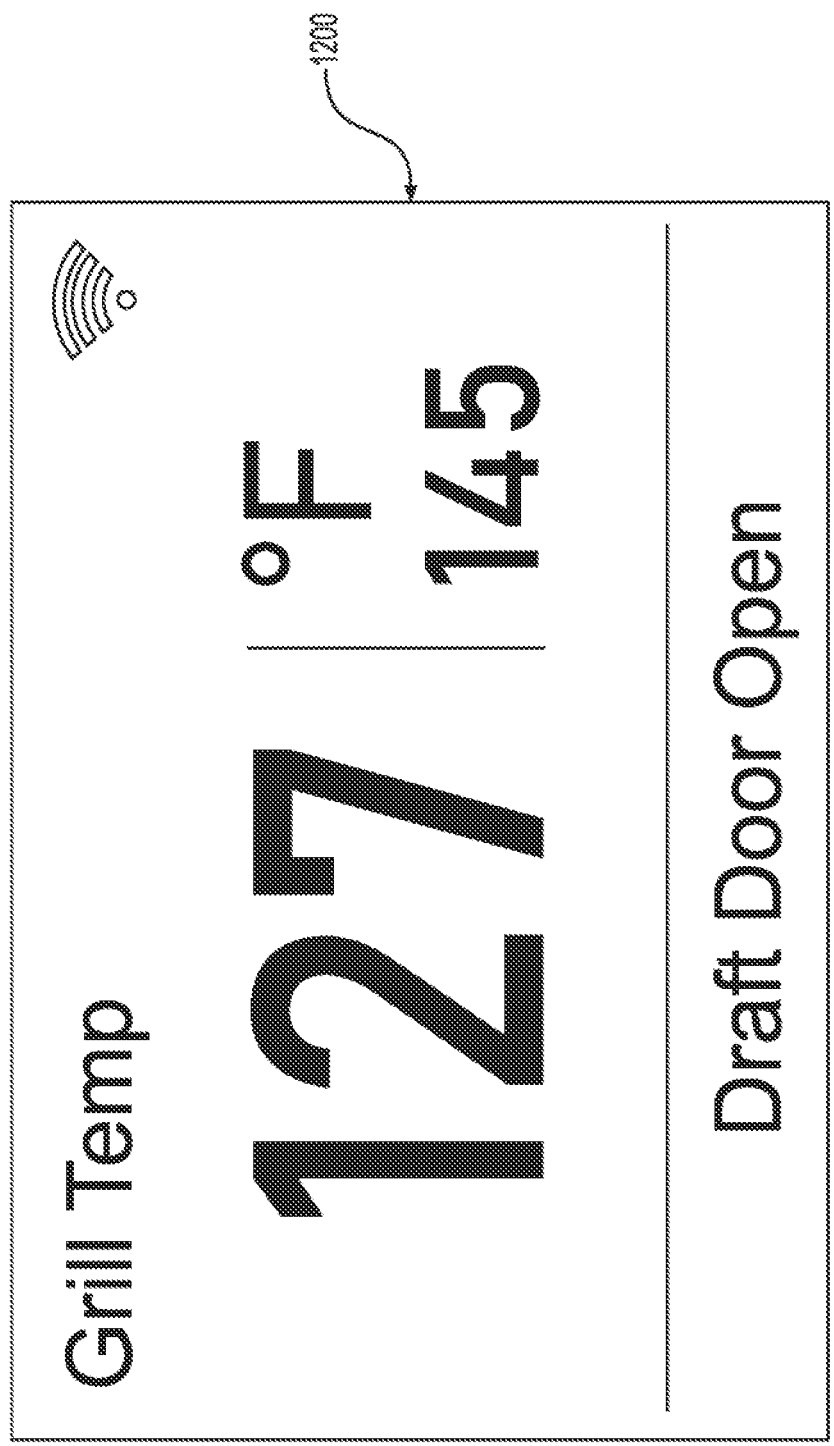
FIG. 12 shows an exemplary user-interface screen that may be displayed to a user on the display unit of the control unit in FIG. 5 to notify the user that at least one air-intake opening in the bottom shell is at least partially open, which is preventing the use of the temperature regulation apparatus in accordance with certain disclosed embodiments.

If, at step 1110, the control unit determines that the slidable door 160 is open, then at step 1120, the control unit sends one or more commands to the integrated fan unit 800 to command that the fan 900 is turned off and thus the adjustable flap is in its closed position, thereby preventing air from flowing from the cooking chamber into the fan outlet 950 and fan 900. In some embodiments, the integrated fan unit 800 may comprise one or more processors or other circuitry for processing the received command(s) from the control unit 200 and sending appropriate signals to turn off the fan 900 and the flap 1000 to be in a closed position; the sequence ends at step 1150. In some embodiments, the display unit 500 may display a user-interface screen 1200, as shown in FIG. 12, to indicate that the draft door 160 is open. In some embodiments, the control unit 200 may provide an audio indication, such as a beep, or another visual indication (such as flashing the text "Draft Door Open") to further notify the user that the slidable door is not fully closed.

If, at step 1110, the control unit 200 determines that the slidable door 160 is fully closed, then at step 1130 the control unit next determines whether the user has set a target temperature for either the cooking chamber and/or any of the meat probes. The user may select a target temperature, for example, using the user input device 220 on the control unit 200 or through user-interface elements of an application on a user device 710. In alternative embodiments, the target temperature may be a predetermined target temperature, for example stored in a memory of the control unit 200 or received from over a network, such as from a cloud service 720, or from the user device 710, that is dependent on a type of food product being cooked or smoked. In such alternative embodiments, the user preferably inputs the type of food product into the control unit 200 or through an application executing on a user device 710.

Next, at step 1140, when the control unit 200 has determined that the user selected a target temperature for the cooking chamber or any of the meat probes, and further determined that the slidable door 160 is fully closed, then the control unit 200 may determine that the kamado-style grill and smoker 100 is in an operational mode where the control unit should automatically control the temperature in the cooking chamber using the integrated fan unit 800 to reach and maintain the user's selected target temperature. In some embodiments, the control unit may be configured to display an icon or other indicator on the screen of the display unit 500 to indicate that it is in an automatic temperature control mode.

At step 1140, the control unit 200 may transmit one or more control signals to the integrated fan unit 800 to command that the fan 900 is turned on causing the adjustable flap 1000 to be in an open position, so that air from the fan 900 can pass through the fan outlet 950, through the one or more openings 195, and into the cooking chamber of the kamado-style grill and smoker 100. In some embodiments, the integrated fan unit 800 may comprise one or more processors or other circuitry for processing received command(s) from the control unit 200 and sending appropriate signals to turn on the fan 900, for example to set the fan to a selected constant fan speed, and cause the flap 1000 to be in an open position. In some embodiments, at step 1140, the control unit may control the fan 900 to operate intermittently or periodically and/or allow the adjustable flap 1000 to be positioned in one or more partially-open positions.

At step 1140, the control unit 200 may be configured to employ various automated temperature control strategies based on one or more target temperatures that it identified at step 1130. For example, to implement a particular automated temperature control strategy, the control unit may send one or more control signals (e.g., commands) to the integrated fan unit 800 to set a speed for the fan 900, a timing or sequence for modulating when the fan 900 is operated, and/or a position of the adjustable flap 1000 at or in-between its fully open and closed positions. For instance, in some embodiments the control unit 200 may employ a control strategy that commands the integrated fan unit 800 to turn on the fan 900 when the control unit has determined that a measured temperature of the cooking chamber or a measured temperature from a particular meat probe is below its corresponding target temperature by a predetermined amount or percentage. Conversely, the control unit 200 may command the integrated fan unit 800 to turn off the fan 900 when the control unit has determined that a measured temperature of the cooking chamber or a particular meat probe is above its corresponding target temperature by a predetermined amount or percentage.

By way of example, the control unit 200 may command that the fan 900 is turned on when a measured temperature of the cooking chamber is below a target temperature by a predetermined percentage (e.g., 5 percent, 10 percent, 15 percent, etc.) or below the target temperature by a predetermined number of degrees (e.g., 1 degree, 2 degrees, 3 degrees, 4 degrees, 5 degrees, etc.). In other embodiments, the control unit 200 may employ more advanced control strategies in which it varies any one or more of the fan speed, the fan timing, the flap position, the aperture size of one or more exhaust openings in the top vent 170, and so forth. In some embodiments, the control unit 200 may determine an appropriate control strategy with the assistance of information it receives from the cloud service 720. The sequence ends at step 1150.

Those skilled in the art will also appreciate that other modifications and alternatives may be implemented in accordance with the exemplary embodiments described herein. For example, the control unit 200 may send control signals to the integrated fan unit 800 formatted as commands or instructions that can be processed or otherwise interpreted by software executing on one or more processors in the integrated fan unit. Further, the display unit 500 of the control unit 200 may be configured to display other user-interface screens and information besides the exemplary user-interface screens 610-650 (FIGS. 6A-E) and 1200 (FIG. 12). For example, the display unit 500 could be further configured to display advertisements, coupons, recipes, still images, streaming video, and/or real-time video. Similarly, each of the control unit 200 and integrated fan unit 800 may have other functionality in addition to those exemplary processes and components described herein. For instance, it will be apparent to those skilled in the art that various processor and memory types, including various computer-readable media, may be used to store and execute program instructions pertaining to the techniques described herein. In other embodiments, as opposed to containing buttons, the control unit 200 may be responsive to touch or voice commands, or receive instructions through an integrated cloud-based voice program (e.g., Amazon Alexa, Google Assistant, Microsoft Cortana, or Apple Siri). In some embodiments, the integrated fan unit 800 may be controlled using an oil-filled capillary tube.

Accordingly, this description is to be taken only by way of example and not to otherwise limit the scope of the embodiments herein. Therefore, it is the object of the appended claims to cover all such variations and modifications as come within the true spirit and scope of the embodiments disclosed herein.

We claim:

1. An integrated kamado-style grill and smoker comprising:
    a top shell and a bottom shell defining a cooking chamber;
    an exhaust vent attached to the top shell, the exhaust vent comprising a plurality of positions corresponding to an aperture size of an exhaust opening of the exhaust vent;
    a fan unit attached to a first opening in the bottom shell;
    a control unit attached to the bottom shell, the control unit in communication with the fan unit; and
    a draft door positioned over a second opening in the bottom shell, the first and second openings being separate openings in the bottom shell;
    wherein the integrated kamado-style grill and smoker is operable in a manual control state in which the draft door and the exhaust vent are manually adjustable to control a temperature within the integrated kamado-style grill and smoker; and
    wherein the integrated kamado-style grill and smoker is operable in an automated control state in which the control unit is configured to adjust one or more properties of the fan unit so as to adjust the temperature within the kamado-style grill and smoker when the draft door is in a closed configuration.

2. The integrated kamado-style grill and smoker of claim 1, wherein the control unit is configured to display one or more instructions to a user of the integrated kamado-style grill and smoker.

3. The integrated kamado-style grill and smoker of claim 2, wherein the one or more instructions comprise a first instruction to adjust the aperture size of the exhaust opening of the exhaust vent.

4. The integrated kamado-style grill and smoker of claim 2, wherein the one or more instructions comprise a control strategy for adjusting the temperature within the cooking chamber.

5. The integrated kamado-style grill and smoker of claim 2, wherein the one or more instructions comprise an instruction to close the draft door.

6. The integrated kamado-style grill and smoker of claim 1, wherein the control unit is configured to wirelessly communicate one or more properties associated with the integrated kamado-style grill and smoker to a mobile device.

7. The integrated kamado-style grill and smoker of claim 6, wherein the control unit is further configured to receive one or more signals corresponding to an instruction from the mobile device.

8. The integrated kamado-style grill and smoker of claim 6, wherein the control unit is configured to detect a temperature within the cooking chamber and transmit a signal comprising the temperature to the mobile device.

9. The integrated kamado-style grill and smoker of claim 1, wherein the fan unit comprises a fan and the one or more properties of the fan unit comprise a speed of the fan.

10. The integrated kamado-style grill and smoker of claim 1, further comprising an igniter in communication with the control unit, wherein the control unit is configured to cause the igniter to start combustion of fuel within the cooking chamber.

\* \* \* \* \*